United States Patent [19]

Magee

[11] Patent Number: 5,231,504
[45] Date of Patent: Jul. 27, 1993

[54] METHOD FOR IMPROVED COLOR REPRODUCTION USING LINEAR MIXING CALCULATIONS BASED ON POSITIONAL RELATIONSHIPS BETWEEN AN ORIGINAL COLOR AND AN ACHROMATIC REGION IN A LINEAR MIXING SPACE

[75] Inventor: Michael R. Magee, Los Gatos, Calif.

[73] Assignee: Xerox Corporation, Stamford, Conn.

[21] Appl. No.: 815,720

[22] Filed: Dec. 30, 1991

[51] Int. Cl.$^5$ .............................................. H04N 1/46
[52] U.S. Cl. ........................................ 358/75; 358/80
[58] Field of Search ................. 358/75, 80, 296, 298; 346/157; 395/131

[56] References Cited

U.S. PATENT DOCUMENTS

| 4,670,780 | 6/1987 | McManus et al. | 358/80 |
| 4,751,535 | 6/1988 | Myers | 346/157 |
| 4,884,130 | 11/1989 | Huntsman | 358/80 |
| 4,941,039 | 7/1990 | E'Errico | 358/80 |
| 4,959,711 | 9/1990 | Hung et al. | 358/80 |

FOREIGN PATENT DOCUMENTS 140784  8/1984  Japan .

OTHER PUBLICATIONS

Meyer, G. W. and Greenberg, D. P., "Perceptual Color Spaces for Computer Graphics", in *Color and the Computer*, H. J. Durrett, ed., Academic Press (1987), pp. 83–100.
*Raster Graphics Handbook* Conrac Corp., Covina, Calif, 1980, pp. A3-1 to A3—37.
Pavlidis, Theo, *Algorithms for Graphics and Image Processing*, Computer Science Press (1982), pp. 326–331.
Judd, D. B. and Wyszecki, G., *Color in Business Science and Industry*, John Wiley & Sons (1975) pp. 164–169.
Foley, J. D., van Dam, A., Feiner, Steven K., and Hughes, John F., *Computer Graphics, Principles and Practice*, Addison Wesley (2nd. Ed. 1990) pp. 574–584.
Hunt, R. W. G., *Measuring Colour*, Ellis Horwood Limited, Chichester, England (1987) (reprinted in 1989) Chapter 2, Section 2.5, pp. 45–46; Chapter 6, Sections 6—6 through 6–7, pp. 135–139.

*Primary Examiner*—Benjamin R. Fuller
*Assistant Examiner*—Scott A. Rogers
*Attorney, Agent, or Firm*—Judith Bares

[57] ABSTRACT

An improved method is disclosed for using a linear mixing space, such as a CIE color space, to determine the quantities of coloring agents needed to reproduce a color, applicable for example to printing a color which matches an original color on a CRT display. The calculations match hue, saturation and reflectance so that the matching color appears like the original color and so that characteristics of an original image are preserved. An original color's definition is converted into coordinates in the linear mixing space. An achromatic region in the linear mixing space, preferably elliptically shaped, is defined to include the coordinates of the neutral coloring agents. Original colors falling within the achromatic region are matched with quantities of neutral coloring agents only. The coordinates of a pure hue approximating the hue of the original color is then determined in the linear mixing space from the coordinates of selected primaries. A saturation ratio is determined which approximates the saturation of the original color in a range from a minimum saturation to a maximum saturation and which excludes the achromatic region from the range. The saturation ratio is used to calculate the quantities of coloring agents which will produce a matching color. A reflectance for the matching color is determined from a function which maps the saturation ratio to a reflectance curve for the primary coloring agents. A quantity of a neutral coloring agent is then determined from the matching color's reflectance.

15 Claims, 11 Drawing Sheets

METHOD FOR IMPROVED COLOR REPRODUCTION USING LINEAR MIXING CALCULATIONS BASED ON POSITIONAL RELATIONSHIPS BETWEEN AN ORIGINAL COLOR AND AN ACHROMATIC REGION IN A LINEAR MIXING SPACE

FIELD OF INVENTION

The present invention relates generally to digital color reproduction, and, in particular, to a color reproduction method for accurately producing a color in a subtractive color printing system which represents an original color. For example, the invention may be used in printing a color which accurately matches a color displayed on a cathode ray tube (CRT) display.

BACKGROUND

Differences between color reproduction devices using additive and subtractive color rendering technologies are well known in the art. Conventional color CRT displays and color television monitors are self-luminous, light-emitting color rendering devices which use an "additive" coloring system. Additive color mixing forms color by adding color stimuli on the retina of the human eye in such a way that they cannot be perceived individually. An additive coloring system may be composed of red, green, and blue (RGB) phosphor signals, referred to as the primary coloring agents (or primary colorants or primary colors) of the system, which combine to form each color of a color image. Such an additive color rendering system is considered to be a linear system because any color producible by the additive system is the sum of the independent primary colorant intensities of the system. The maximum intensity level of all three phosphors produce the system's "white point", that is, the white color of the monitor when the luminance outputs of the three phosphors are at their maximum values. Thus, additive primary colors, when mixed, produce a color of greater intensity than the primary colors themselves. Similarly, the mixture of all three primary colors at the minimal intensity level yields black.

Digital color printers, color copiers, color electrostatic plotters, and similar printing devices are non-self-luminous, light-absorbing and reflective color rendering devices and produce color according to a subtractive color process by applying the primary coloring agents (i.e., the dyes, inks, toners, or pigments) to a white medium (or a transparent medium if back-lit). Light is reflected from the surface on which the color appears and the combination of the light-absorbing coloring agents used "subtract" colors from the source illumination by canceling bands of wavelengths to provide the proper color. In keeping with current practice, colors displayed on a device using a subtractive color system are comprised of certain amounts of cyan, magenta, and yellow (CMY) primary coloring agents (or primary colorants or primary colors); these coloring agent amounts, specified as CMY signals to the device, produce the desired color. Application of no coloring agents produces white, and thus, the device's reference white point, or white color, is usually considered to be the white substrate (paper) on which the primary coloring agents are laid down, with respect to a given source or viewing illuminant. Application of all coloring agents produce black. Alternatively, some subtractive color devices also may use a black coloring agent to darken colors that are not otherwise dark enough as a result of combining the primary coloring agents, or to reduce ink deposition on the substrate, for example in order to achieve better neutral tones. In contrast to the linear additive color reproduction system, the subtractive color reproduction system is nonlinear: mixing coloring agents in the subtractive system results in further spectral absorption, producing a darker color than the primary coloring agents which are mixed. In addition, imperfections in the spectral content of the subtractive primary coloring agents may introduce wavelength reflectance "contamination" of unwanted color when the coloring agents are deposited on a substrate.

All of the colors physically producible by a color reproduction device is called the "gamut" of the device. The gamuts of additive and subtractive color reproduction devices do not correspond to one another because the devices produce color according to the different physical methods described above. Reproducing a color's appearance accurately or appropriately for a particular situation requires selecting the color in the output system's device gamut which most accurately reproduces the appearance of the color as specified in the input system's device gamut.

Accurate and appropriate color reproduction between devices utilizing different color reproduction technology is aided by a device independent representation of color where an input image color is matched to an appropriate output gamut color in a color specification format that is independent of both the input and output primary coloring agent specifications. One such colorimetric, device independent color specification conforms to an internationally recognized and standardized color notation system established by the Commission Internationale de l'Eclairage (the "CIE"). Based on the premises that the spectral reflectance of an object is the percentage of the incident light energy reflected at each wavelength and that the color of an object may be precisely defined as this spectral reflectance, the CIE standard assigns numeric values to colors according to their appearance under standard sources of illumination as viewed by a standard observer, such as the "CIE 1931 Standard Colorimetric Observer" (also known as the "2° Observer", hereafter referred to as the "standard observer"), using three values, X, Y, and Z, to describe colors. The X, Y, and Z values, called the "tristimulus values" of a color, represent a summation of the color contributions of all wavelengths within the spectral distribution of a color sample, corrected for the light source used to illuminate the colored sample and for the color sensitivity of the standard observer. Additional information about the CIE system is available from a number of texts and other sources. In particular, additional relevant information may be found in G. W. Meyer and D. P. Greenberg, "Perceptual Color Spaces for Computer Graphics", in *Color and the Computer*, H. J. Durrett, ed., Academic Press, 1987, pp. 83–100; and *Raster Graphics Handbook*, Conrac Corp., Covina, Calif., 1980, at pages A3-1 to A3-37 (hereafter, "*Raster Graphics Handbook*").

Color correction methods used to map colors from an additive color system's gamut to a subtractive color system's gamut generally use look up tables, matrices, or mathematical transformations for mapping an input image color to its colorimetric color specification and then to an appropriate matching output color, expressed in subtractive primary coloring agent quantities, in the gamut of the subtractive color reproduction device. These methods generally require the measurement of large numbers of colorimetrically measured color patches produced by the subtractive color reproduction device for representing the output color gamut. See, for example, Hung et. al., U.S. Pat. No. 4,959,711, entitled "Method and Apparatus for Correcting the Color of a Printed Image"; and E'Errico, U.S. Pat. No. 4,941,039, entitled "Color Image Reproduction Apparatus Having a Least Squares Look-Up Table Augmented by Smoothing". These techniques, which require matrices or tables which depend on the color of each primary coloring agent, need to be recalculated whenever a primary coloring agent changes.

U.S. Pat. No. 4,751,535, issued to Myers and assigned to Xerox Corporation, the same assignee herein, provides a technique for matching a color which does not require colorimetric measurement of a large number of color patches, and which uses a device independent, linear mixing space, such as a CIE color space, in which to produce an appropriate matching color. A definition of the original color, such as its RGB coordinates, is converted to coordinates in the linear mixing space, such as CIE coordinates. These coordinates, together with coordinates of the toners used by the printer are then used to calculate quantities of toners which will produce a matching color. The calculations match hue, saturation and reflectance so that the matching color appears like the original color and so that characteristics of an original image are preserved.

The complete specification of the color matched printing method of U.S. Pat. No. 4,751,535 may be found in the disclosure thereof which is hereby incorporated by reference. FIG. 1 shows the general steps of the method. Briefly summarized, the method according to U.S. Pat. No. 4,751,535 of determining quantities of the primary coloring agents to be used to generate a matching color begins with the step of colorimetrically measuring, in box 20, the linear mixing coordinates of the three CMY primary coloring agents, the three RGB secondary coloring agents produced by combining the CMY primary coloring agents, black, and the white of the substrate (paper). These measurements include the x, y chromaticity coordinates (or chromaticities) of the CIE color space known as the 1931 Chromaticity Diagram, and the color's luminance, or reflectance value, Y. Next, in box 22, the linear mixing coordinates of the original color are determined through known conversion techniques. The original color's additive RGB coordinates, for example, are converted first into XYZ tristimulus values and then into x, y chromaticities using known matrix transformations and conversion equations. The luminance, or reflectance value Y, of the original color is then adjusted in box 24 for out-of-bounds reflectance values, which occur when an original color is lower in reflectance than the measured black coloring agent or higher in reflectance than the measured paper white.

Then, using the original color's chromaticity coordinates and reflectance value and the linear mixing coordinates of at least three of the primary coloring agents to be applied, the subtractive primary coloring agent quantities needed to reproduce a matching color are determined in boxes 26 through 34. FIG. 2 shows the hexagonally shaped device gamut in which the original color will be matched. The gamut is defined by the two-dimensional x, y chromaticity coordinates of the six primary and secondary measured coloring agents plotted in the 1931 Chromaticity Diagram. The gamut is divided into six mixing triangles by a center point inside the hexagon, each triangle having the center point as one vertex and the end points of one side of the hexagon as its other vertices. An original color falling into one of the mixing triangles will be matched by quantities of the primary and secondary coloring agents at the vertices and a quantity of a neutral or achromatic coloring agent, (either white or black) as shown in FIG. 2.

In box 26, the chromaticities of the center point of the gamut, $x_n$, $y_n$, are calculated to be at the coordinates of the achromatic color with the same reflectance, $Y_o$, as the original color. These achromatic coordinates, $x_n$, $y_n$, are calculated using the original color's coordinates, $x_o$, $y_o$, and the coordinates of the white, $x_w$, $y_w$, and black, $x_b$, $y_b$, neutral coloring agents. In the method of U.S. Pat. No. 4,751,535, these center point coordinates are calculated to be on an achromatic mixing line almost perpendicular to the Chromaticity Diagram, the end points of which were determined by the chromaticities of the reference paper white and the black color produced by the device coloring agents. FIG. 3 shows achromatic mixing line 52 bounded by end points B, the $x_b$, $y_b$ chromaticities at reflectance $Y_b$, and W, the $x_w$, $y_w$ chromaticities at reflectance $Y_w$. Achromatic mixing line 52 is not strictly perpendicular to the x, y mixing plane of the Chromaticity Diagram because the black and white achromatic colors do not have the same chromaticities. The chromaticities $x_w$, $y_w$ are shown plotted at W', connecting to W along line 54 perpendicular to the Chromaticity Diagram.

As noted above, the matching color lies within one of the mixing triangles of FIG. 2, which is selected next, in box 28 of FIG. 1, based on the coordinates of the center point and of the original color, using a vector cross-product technique and calculation described in detail in U.S. Pat. No. 4,751,535 at col. 12 line 56, and shown diagrammatically in FIG. 8 therein.

The next step, in box 30 (FIG. 1) involves finding the coordinates, $x_p$, $y_p$, $Y_p$, of a "pure hue". As shown in FIG. 4, geometrically and mathematically, a line projecting from the center point $x_n$, $y_n$, labeled Neutral in FIG. 3, through the original color intersects a side of the selected mixing triangle. The intersection point $x_p$, $y_p$, defines the pure hue, undiluted with neutral coloring agents, which matches the hue of the original color. Calculation of the pure hue permits calculation of the quantities of the two primary and the neutral coloring agents which will approximate the hue, saturation and reflectance of the original color in the device gamut. The primary coloring agents at the end points of the intersected side, labeled Primary1 and Primary2 in FIG. 3, always include one of the CMY primary coloring agents and one of the RGB secondary coloring agents. These coloring agents are "mixed" in relative quantities to obtain the pure hue according to the relationship between the lengths of the parts P1 and P2, into which the line of the intersected side is divided. In particular, the relative quantities of Primary1 and Primary2 have the same ratio as the lengths of the parts P1 and P2 of the linear mixing line bounded by those primaries, as follows:

$$\frac{\text{Qty of Primary 1}}{\text{Qty of Primary 2}} = \frac{P1}{P2} \tag{1}$$

As used herein, "mixing" refers to the mixing of two or more coloring agents in adjacent areas of a pattern, with negligible superimposition. It will be understood that the dots or other areas of the pattern which contain distinct coloring agents must be small enough to be below the resolution limit of the human eye, so that the pattern is perceived as having a single color.

It is important to note the labeling of line segments P1 and P2 in FIG. 3 to see how the line segments P1 and P2 are proportional to the Primary quantities. When the pure hue at $x_p$, $y_p$ is equal to Primary1, 100% of Primary1, represented by line segment labeled P1 extending from Primary2, and 0% of Primary2, represented by line segment P2 extending from Primary1, are needed to formulate the pure hue. Similarly, as the pure hue approaches Primary2 along the linear mixing line, the amount of Primary1 decreases from 100% as line segment P1 gets shorter, and the amount of Primary2 increases from 0% as the line segment P2 gets longer.

Thus, the relative quantities of Primary1 and Primary2 can be determined from the P1 and P2 fractions of the total length of the linear mixing line, as follows:

$$P1 = \frac{[(x_{primary2} - x_p)^2 + (y_{primary2} - y_p)^2]^{0.5}}{[(x_{primary1} - x_{primary2})^2 + (y_{primary1} - y_{primary2})^2]^{0.5}} \quad (2)$$

and $$P2 = 1 - P1 \quad (3)$$

where pure hue coordinates $x_p$, $y_p$ are first calculated from slope equations for the two intersecting lines.

Finally in box 30 (FIG. 1), in preparation for adjusting saturation and reflectance in box 32, and for finding the primary coloring agent quantities in box 34, the reflectance of the pure color, $Y_p$, is then calculated using the P1, P2 fractional line lengths and the reflectances of the two primaries, $Y_{primary1}$ and $Y_{primary2}$ as follows:

$$Y_p = P1 \cdot Y_{primary1} + P2 \cdot Y_{primary2} \quad (4)$$

In box 32 of FIG. 1, a second linear mixing plane is used to adjust the saturation and reflectance of the pure hue in order to obtain the matching color. During this adjustment, the hue, saturation and reflectance is approximated from calculating the relative quantities of the two primary and the neutral primary coloring agents in a manner which preserves the color characteristics of an original image which contains the original color. The adjustment in step 32 may be performed in a number of ways, as appropriate for the specific image being reproduced.

A major consideration in preserving the color characteristics of the original image is how to treat an original color which is outside the three-dimensional gamut of available colors. In general, the relative quantities of the two primaries which generate the pure hue do not need to be adjusted, but the quantities of the neutral coloring agents which are mixed with them must be adjusted to provide a suitable approximation of an original color outside the gamut. Mixing in neutral coloring agents will change the saturation and reflectance of the pure hue but it is usually possible to change these parameters while nonetheless preserving the color characteristics of the original image. For example, if the original image has colors which are distinguishable by saturation differences, the saturation differences can be preserved across a range of available saturation values. Similarly, if the original image has colors distinguishable by reflectance, reflectance differences can be preserved. In general, an appropriate compromise between preserving saturation characteristics and preserving reflectance characteristics can be found. The method of U.S. Pat. No. 4,751,535 permits saturation and reflectance to be flexibly adjusted in whatever way is appropriate to the image being produced.

In the implementation of step 32 described in U.S. Pat. No. 4,751,535, reflectance characteristics of an original image are preserved at the expense of saturation characteristics. FIG. 5 shows a second, triangular mixing plane defined by vertices at the pure hue, at coordinates $x_p$, $y_p$, $Y_p$, at the neutral coloring agent white, at coordinates $x_w$, $y_w$, $Y_w$, and at the neutral coloring agent black, at coordinates $x_b$, $y_b$, $Y_b$. The original color, at coordinates $x_o$, $y_o$, $Y_o$, may either be inside this triangle, if the original color is inside the gamut of the subtractive color reproduction device, or outside the triangle, if the original color is outside the gamut of the device. Within the triangular mixing plane, the pure hue, at $x_p$, $y_p$, $Y_p$, is adjusted in all three dimensions from a line of constant reflectance at $Y = Y_p$ to the line of constant reflectance of the original color, $Y = Y_o$, specifically to a point $x_{pn}$, $y_{pn}$, $Y_o$. A reflectance adjustment amount, $t_{pn}$, is computed during this adjustment. If the original color falls outside the triangle, the matching color is the most saturated available color on that line, at a point $x_{pn}$, $y_{pn}$, $Y_o$, but if the original color is in the triangle, the technique also adjusts the saturation of the matching color to that of the original color, computing a saturation adjustment ratio, $R_{p/n}$, during this adjustment. Table 1 summarizes the equations used to complete the adjustments made in box 32 of FIG. 1.

TABLE 1

| | |
|---|---|
| $Y_{neutral} = Y_b$ if $Y_o < Y_p$ | (5) |
| $Y_{neutral} = Y_w$ if $Y_o > Y_p$ | (6) |
| $t_{pn} = \dfrac{(Y_o - Y_{neutral})}{(Y_p - Y_{neutral})}$ | (7) |
| $x_{pn} = x_{neutral} + t_{pn}(x_p - x_{neutral})$ | (8) |
| $y_{pn} = y_{neutral} + t_{pn}(y_p - y_{neutral})$ | (9) |
| $A_o = \{(x_o - x_n)^2 + (y_o - y_n)^2\}^{0.5}$ | (10) |
| $A_{pn} = \{(x_{pn} - x_n)^2 + (y_{pn} - y_n)^2\}^{0.5}$ | (11) |
| $R_{p/n} = \dfrac{A_o}{A_{pn}}$ if $\dfrac{A_o}{A_{pn}} \leq 1.0$ | (12) |
| $R_{p/n} = 1.0$ if $\dfrac{A_o}{A_{pn}} \geq 1.0$ | (13) |

In box 34 of FIG. 1, the quantities of the coloring agents needed to match the original color are determined. Ordinarily in a printer, the white coloring agent is the white of the paper on which the other coloring agents are printed, so that the white coloring agent will be present wherever none of the other coloring agents is printed. Therefore, the only coloring agent quantities to be calculated in box 34 in FIG. 1 are those of the black coloring agent, denoted as $a_b$, and the two primary coloring agents which mix to provide the pure hue. As shown in equation (17) below, the quantity of black coloring agent can be directly calculated, while the quantities of the primaries must take into account the selection of the primary color pair in box 28. The total amount of the two primary coloring agents which mix is denoted simply as $a_p$ and will differ if the equipment used provides for complete undercover removal by using a black coloring agent, as shown in equations (18)

and (19). Table 2 summarizes the equations needed to determine these neutral and primary coloring agents.

TABLE 2

| | |
|---|---|
| $a_w$ = the amount of white | (14) |
| $a_b + a_w + a_p = 1.0$ | (15) |
| $Y_0 = a_bY_b + a_wY_w + a_pY_p$ | (16) |
| $a_b = \dfrac{\{Y_0 - Y_w + a_p(Y_w - Y_p)\}}{(Y_b - Y_w)}$ | (17) |
| $a_p = R_{p/n} * t_{pn}$ for all $Y_0$(undercolor removal) | (18) |
| $a_p = R_{p/n}$ for $Y_0 < Y_p$(no undercolor removal) | (19) |

Since the total quantity $a_p$ of the pure hue is made up of two primary coloring agents, a subtractive CMY primary and an adjacent subtractive RGB primary (also called a secondary), the pure hue is actually generated from two of the subtractive CMY primaries. One CMY primary will be present throughout the pure hue areas, while the other CMY primary will be superimposed with the first primary only in the RGB primary areas. The relative amounts of each CMY primary depend in which mixing triangle the original color falls. Table 3 summarizes how to determine the quantities of CMY primaries. P1 and P2 are the quantities determined in equations (2) and (3) above, and the symbol * denotes multiplication.

TABLE 3

| Mixing Triangle | | Quantity of | Quantity of | Quantity of |
|---|---|---|---|---|
| Primary1 | Primary2 | Cyan | Magenta | Yellow |
| Cyan | Green | $a_p$ | 0 | P2 * $a_p$ |
| Green | Yellow | P1 * $a_p$ | 0 | $a_p$ |
| Yellow | Red | 0 | P2 * $a_p$ | $a_p$ |
| Red | Magenta | 0 | $a_p$ | P1 * $a_p$ |
| Magenta | Blue | P2 * $a_p$ | $a_p$ | 0 |
| Blue | Cyan | $a_p$ | P1 * $a_p$ | 0 |

Finally, in boxes 36 and 38 of FIG. 1, an area coverage pattern is selected which will best approximate the coverage provided by the quantities of the two primary and the neutral coloring agents.

The color matching technique disclosed in U.S. Pat. No. 4,751,535 is easy to use and implement because it is based on the discovery of a computational technique which accurately determines coloring agent quantities directly from the definition of the original color. However, the technique has been found to produce inappropriately matching colors when matching low chroma or nearly achromatic colors. For those colors, unpredictable and undesirable shifts in hue may occur which also may affect the method's ability to produce a balanced and smoothly changing gray scale of achromatic colors. In addition, the printing of standard test patterns of color patches involving uniformly changing colored squares from one CMY primary to another shows the tendency for the method to unpredictably produce under-saturated colors with too much black.

The color matching technique disclosed in U.S. Pat. No. 4,751,535 reproduces accurate colors without the use of extensive colorimetric measurement of sample colors and without extensive sample color remeasurement and recalculation of tables or matrices when coloring agents in the subtractive device change. The method is preferably implemented by measuring and storing in advance the linear mixing coordinates of the subtractive device's coloring agents, provided the variation about the measured values is relatively small, rather than measuring these coordinates each time an image is generated. In practical application, the method has been implemented by supplying in a coded, unchangeable format, the linear mixing coordinates of the colorimetrically measured CMY, RGB, black, and white colors produced by a particular device on a particular substrate under certain manufacturer controlled environmental conditions. The method implemented in this manner produced inaccurately matching colors when a substrate or coloring agent was used in the device which varied from the manufacturer's standards. In such an implementation, there is no ability for the user to tailor the device's color reproduction performance to meet the type of substrate (paper), coloring agent, or environmental condition actually being used.

SUMMARY OF THE INVENTION

The invention described herein is a modification to the color matching method disclosed by Myers in U.S. Pat. No. 4,751,535. Such an improved color reproduction method makes use of novel techniques for defining an achromatic mixing region to be used in determining the quantities of coloring agents needed to match an original color, and for determining the reflectance value for the matching color, thereby overcoming the deficiencies in U.S. Pat. No. 4,751,535 noted above. In addition, two other improvements which accommodate particular environmental factors and particular original images, respectively, also enhance the accuracy of the color reproduction method. The method provides for user input of colorimetrically measured linear mixing coordinates for the actual subtractive device coloring agents and substrate being used under actual production conditions. The method also facilitates the reproduction of an original image such that the output colors are predictably spaced in the output gamut in the same manner as the colors in the input image relate to each other by providing a particular conversion model for the original color's definition to produce linear mixing coordinates for the original color for an ideal additive source device.

Therefore, in accordance with the present invention, there is provided an improvement for a method for reproducing an original color which uses a linear mixing space. The method comprises the steps of selecting at least two primary coloring agents from at least three coloring agents whose linear mixing coordinates define a polygon, the coordinates of the at least two coloring agents defining vertices at ends of a side of the polygon, and selecting linear mixing coordinates of a center point within the polygon, the center point defined by the linear mixing coordinates of a neutral coloring agent. Then, a line is projected from the center point's coordinates through linear mixing coordinates of the original color to intersect the side of the polygon. Linear mixing calculations are performed with the original color's linear mixing coordinates and the linear mixing coordinates of the at least two primary coloring agents and of at least one neutral coloring agent to determine quantities of the coloring agents to be used to generate a color approximating the original color. The linear mixing calculations comprise calculating relative quantities of the selected primary coloring agents based on lengths of parts of the side of the polygon; and calculating relative quantities of a mixture of the selected primary coloring agents and of a neutral coloring agent based on lengths of parts of the projecting line. Then, a pattern which closely approximates the determined quantity of each coloring agent is selected and the coloring agents are applied in the selected pattern to produce the matching color.

The present improvement to the method comprises defining an achromatic region in the polygon containing linear mixing coordinates of at least two neutral coloring agents. Preferably, the achromatic region is an ellipse having a center point defined by the linear mixing coordinates of an equal energy stimulus, and having a semi major axis oriented in the linear mixing space substantially parallel to a line tangential to a curve defined by the linear mixing coordinates of a plurality of reference illuminants (also called Planckian radiators), the tangential line being tangent to a point on the curve equal to the coordinates of the equal energy stimulus. The achromatic region defines a region where the primary coloring agent quantities will be zero, and only neutral coloring agents, specifically the black coloring agent, will produce a matching color. Thus, in calculating relative quantities of a mixture of the selected primary coloring agents and of a neutral coloring agent based on the lengths of parts of the projecting line, the lengths of parts of the projecting lines are determined based on the portion of the projecting line which lies outside the achromatic region.

An another aspect of the present invention, the reflectance value for a color matching an original color is determined in a novel way according to an equation developed through empirical testing which maps a previously calculated saturation ratio to a reflectance curve. This matching color reflectance value is then used to determine the amount of a neutral coloring agent to be applied to produce a matching color. In particular, the matching color reflectance value is used to determine the amount of black coloring agent to apply.

In still another aspect of the present invention, there is provided a saturation ratio accelerator factor for tailoring an original highly saturated or lightly saturated image to the gamut of the subtractive reproduction device in order to preserve the high or low saturation characteristics of the original image.

BRIEF DESCRIPTION OF THE DRAWINGS

Other aspects of the present invention will become apparent as the following description proceeds and upon reference to the drawings, in which.

DETAILED DESCRIPTION

Figure 1:
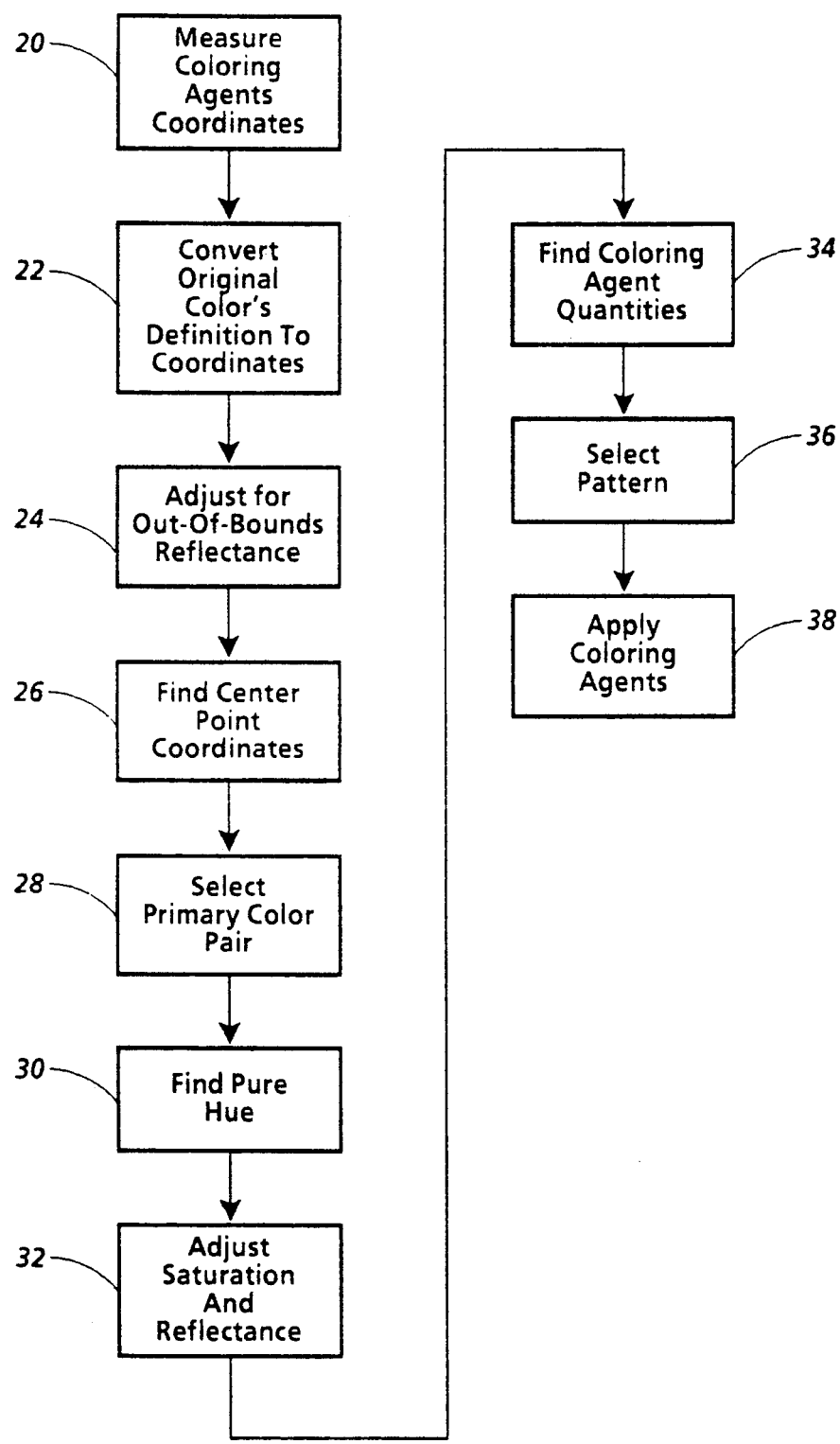
FIG. 1 is a flowchart of the general steps of a known color matching method.

While the present invention will be hereinafter described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like references have been used throughout to designate identical elements.

As in the prior inventive method of U.S. Pat. No. 4,751,535, the present invention is based in part on the recognition that color matching involves two separable problems. The first problem is to determine the quantities of coloring agents which will produce a color matching the original color. The second is to determine a pattern of coloring agents which will provide those quantities.

Figure 6:
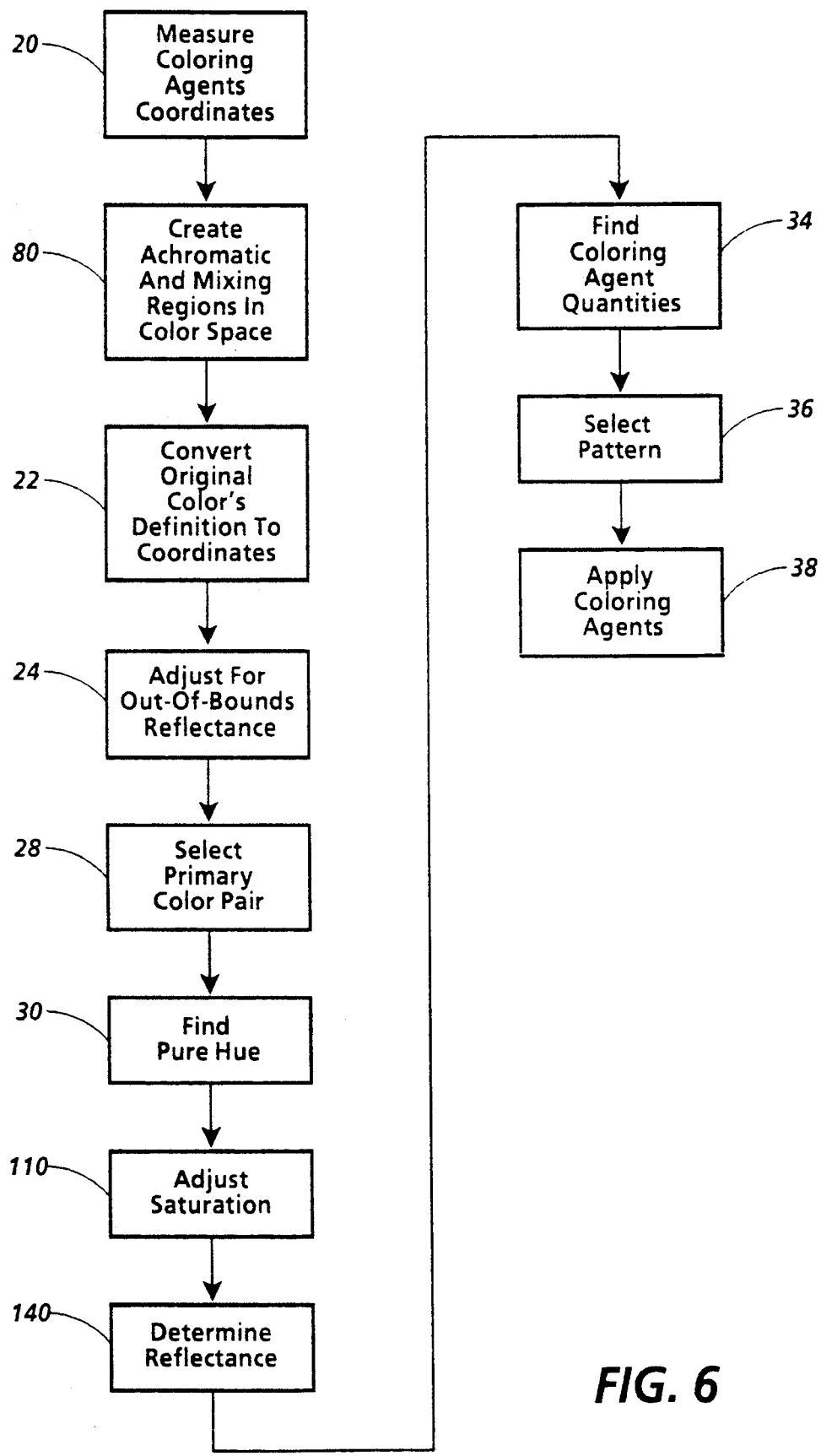
FIG. 6 is a flowchart of the general steps of an improved color reproduction method according to the present invention.

FIG. 6 shows one technique according to the present invention for determining coloring agent quantities making use of linear mixing in the CIE Chromaticity Diagram. Reference numerals identical to the reference numerals used in FIG. 1 have been used in FIG. 6 to identify those broad steps which are common to both the prior and present color matching methods. However, it should be noted that some broad steps of the prior method have been expanded or modified in the present method, and those expansions or modifications are illustrated where necessary in other figures and in the description which follows herein.

The technique of the present invention begins with a preliminary step in box 20, the measuring and storing of the coordinates of the coloring agents which will be used to generate the matching image. Although the coordinates could be in any appropriate color space, they are preferably the coordinates of each coloring agent in a linear mixing color space such as the CIE 1931 Chromaticity Diagram, which makes use of each coloring agent's CIE x, y, Y coordinates.

The earlier color matching method recognized that it is very important and highly preferable to obtain accurate, actual colorimetric measurements of the linear mixing coordinates with a spectrophotometer or colorimeter. These measurements include the CIE x, y, Y coordinates of each of the primary (CMY) and secondary (RGB) coloring agents which will be applied, the CIE x, y, Y coordinates of the black color produced either by the superimposition of C, M, and Y, or from the black coloring agent, and the CIE x, y, Y coordinates of the substrate (paper) which serves as the reference white. Rather than measure the linear mixing coordinates of the coloring agents each time an image is generated, it typically suffices to measure and store the coordinates of a representative sample of each coloring agent in advance, provided the variation about the measured values is relatively small.

The method of the present invention, however, recognizes that accurate and appropriate color reproduction is affected by many different coloring agent and environmental factors that would not be provided for in all cases by advance colorimetric measurement of the necessary coloring agents, even if those measurements are highly accurate. Accurate and appropriate color reproduction is affected by whether color changes occur in the coloring agents being used to produce the matching color, by changes in the application characteristics of the coloring agents, such as changes in the viscosity of a toner, by changes in the equipment used to apply the coloring agents, whether a printer, plotter, CRT or other equipment, and also by changes in the surface characteristics of the medium to which the coloring agents are applied. If one cyan toner, for example, is replaced with another which is closer to blue, then a different quantity of cyan toner is needed to produce the matching color. Similarly, color changes resulting from changes in temperature, humidity, paper or other causes may change the quantities of coloring agents which produce the matching color. A satisfactory method for color reproduction must accommodate such coloring agent and environmental changes.

The method of the present invention provides for the situation where advance colorimetric measurement of the necessary coloring agents is not appropriate for a particular user because the specific coloring agents that were previously measured are not being used; or because the user may be using a different substrate than that measured so as to generate a different set of linear mixing coordinates for the reference white than that provided in a pre-measured set of linear mixing coordinates; or because the color reproduction device is being used under unusual environmental conditions which affect the performance of the coloring agents on the particular substrate used. Therefore, in one embodiment of the measuring step of box 20, several combinations of coloring agents and substrates are measured and these linear mixing coordinates are made available for selection by the user of the method to most closely define the conditions under which color reproduction will be performed. In addition, there is provided a mechanism for the user of the method to specify his or her own measurements for a specific combination of coloring agents and substrates when the conditions under which color reproduction will be performed are not available for selection.

Figure 7:
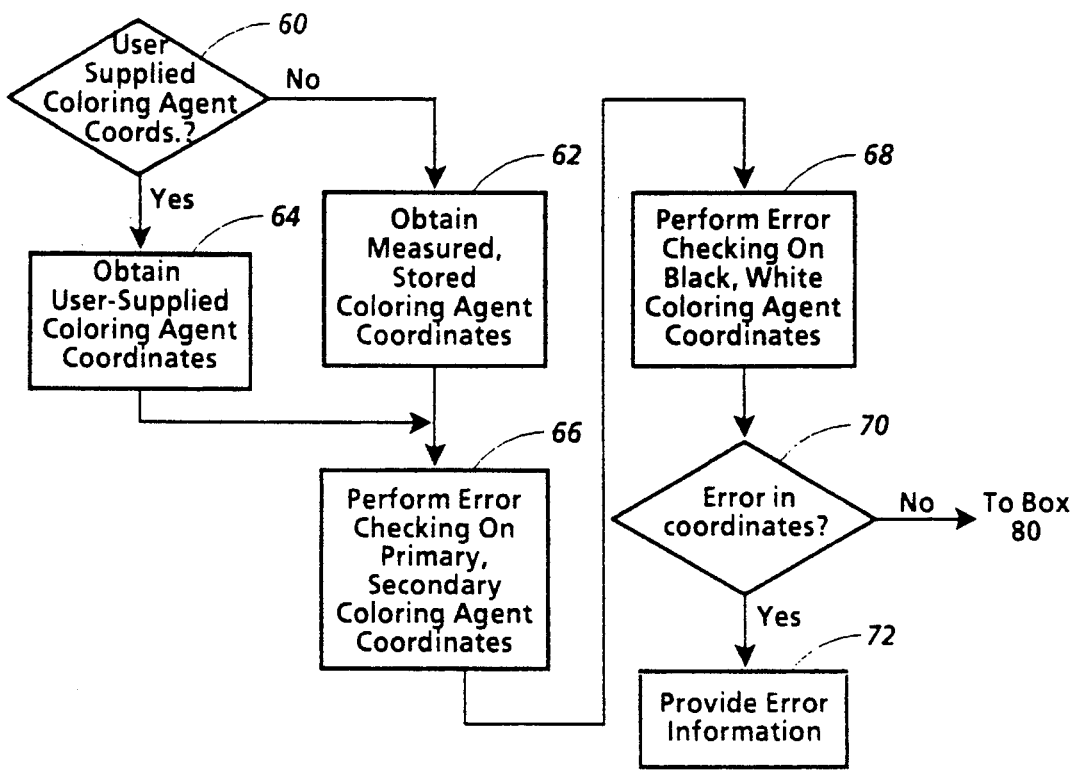
FIG. 7 is a flowchart illustrating in greater detail the operation of block 20 in FIG. 6 for obtaining valid measured coloring agents according to the method of the present invention.

FIG. 7 illustrates the substeps of the measuring step of box 20 to accommodate the user's definition of the conditions under which color reproduction will be performed. The measuring step of box 20 provides the method of the present invention with the proper set of measured primary, secondary, black, and white coloring agent coordinates to be used for reproducing an original color. In box 60, a query is made to determine if the user of the method will be supplying a set of measured coloring agent coordinates. This query is made in any conventional manner for detecting a user-supplied input. If the query is negative, the previously measured and stored coloring agent coordinates for a particular set of coloring agents on a specific substrate are obtained, in box 62, for use in the remaining steps of the method. If the query is positive, the user-supplied measured coordinates are obtained, in box 64.

It is preferable to establish a format and order for supplying both the predetermined and user-supplied measured coordinates. In the illustrated embodiment of the method of the present invention, the measured coordinates are provided as four fields of information with a Color Name Token (e.g., "CYAN", or "RED", or "MAGENTA", etc.) identifying the coloring agent information to follow, followed by three decimal numbers between zero and one, positionally supplied to represent respectively the x, y, and Y chromaticity and luminance (reflectance) values of each measured coloring agent. In particular, the Y value, which is usually measured on a scale of zero to one hundred, should be scaled to be between zero and one. Preferably, the coloring agent measurements are provided in the order of Cyan, Green, Yellow, Red, Magenta, Blue, Black and White. However, they may be provided in any order, as long as they are identified with the proper Color Name Token.

Next, in boxes 66 and 68 error checking is performed on the received coloring agent coordinates to ensure as much as possible that the coordinates have been correctly entered and are valid for the device gamut. Conventional error checking techniques may be used first, in box 66, to verify that all eight measured coordinate sets have been provided, and that each set of coordinates provided are in the proper 0-1 range.

Figure 2:
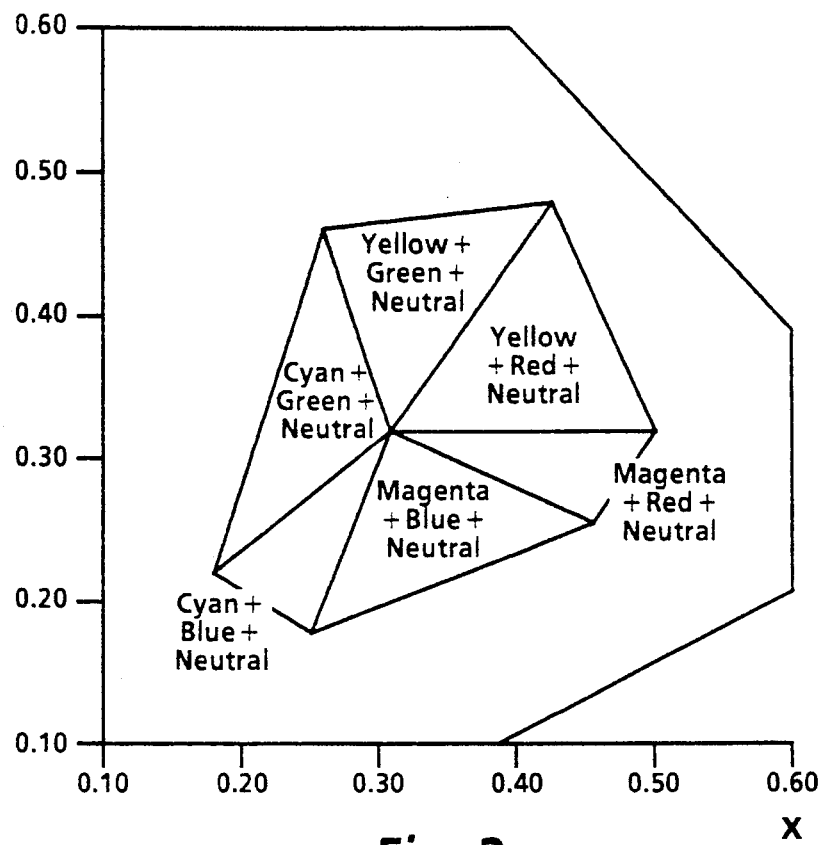
FIG. 2 is a graph showing a linear mixing plane in a portion of the conventional CIE color space containing the CMY color gamut divided into color mixing triangles, as used by the method steps of FIG. 1.

In addition, it is preferable to verify the primary and secondary coloring agent coordinates for logical correctness. As noted above with respect to boxes 26 through 34 of FIG. 6 and in conjunction with the discussion of FIG. 2, the definition for the reproduced color which matches the original color is determined using a hexagonally shaped device gamut divided into mixing triangles, each mixing triangle having as one vertex a center point inside the hexagon, and having as its other two vertices, a pair of the six primary and secondary measured coloring agents defined by the two-dimensional x, y chromaticity coordinates plotted in the 1931 Chromaticity Diagram. It is possible to verify that the measured coordinates logically make the desired mixing triangles when plotted in the Chromaticity Diagram. One way to accomplish this verification is to first sort the measured coordinates into the preferred order of Cyan, Green, Yellow, Red, Magenta, and Blue, noted above. Then, drawing a vector line segment from the first color to the next color in the sorted order, and in a clockwise direction around the gamut, it is possible to verify that this line segment is to the left of a particular centrally located point, such as the point known as the "equal energy white" or the "equal energy stimulus" point of the Chromaticity Diagram, as defined by the CIE, at coordinates x=0.333334 and y=0.333330. Then, this line segment test may be repeated for each successive pair of sorted, measured coloring agent coordinates in the sorted order to ensure that the line segment drawn for each pair is to the left of the equal energy stimulus point. Such a test may be accomplished using conventional line segment intersection and point-line segment position algorithms, such as those found in *Algorithms for Graphics and Image Processing*, by Theo Pavlidis, Computer Science Press, 1982, at pages 326-331 (hereafter, "Pavlidis").

In box 68, the chromaticity coordinates for the black and white coloring agents are tested to ensure that they are inside the gamut defined by the measured coordinates for the primary and secondary coloring agents. Such a test may be accomplished using a conventional algorithm for determining the position of a point with respect to a polygon, such as that also found in the Pavlidis reference mentioned above. In box 70, a query is made to determine whether an error in the measured coordinates has been discovered in any of the tests made in boxes 66 and 68. If so, information about the error is provided to the user in box 72 so that the coloring agent coordinate information may be remeasured, if necessary, and resubmitted to box 20 (FIG. 6).

Returning now to FIG. 6, the next step in the method for determining the quantities of the primary coloring agents needed for matching an original color is to define an achromatic color area within the gamut of the subtractive color reproduction device and to define the mixing regions to be used for color matching in subsequent steps of the method. The color matching method described in U.S. Pat. No. 4,751,535 produced inappropriately matching colors when matching low chroma or nearly achromatic colors. The earlier method used an achromatic mixing line 52 (FIG. 3) for defining the center point of the subtractive color reproduction device gamut, which in turn is used to define one of the vertices for each of the mixing triangles.

Briefly stated, the method of the present invention defines an achromatic region on the Chromaticity Diagram such that for any original color falling within the achromatic region, only a quantity of a neutral coloring agent need be determined to match the original color. For an original color falling outside the achromatic region, the substeps for adjusting the saturation and reflectance, in boxes 110 and 140, from information about the pure hue found in box 30, involve determining where the original color is in relationship to the achromatic region boundary, and not in relationship to the achromatic mixing line 52 (FIG. 3), as in the earlier method. The broad step of creating the achromatic region is shown in box 80 of FIG. 6, and is described in more detail in the flowchart of FIG. 9.

Figure 8A:
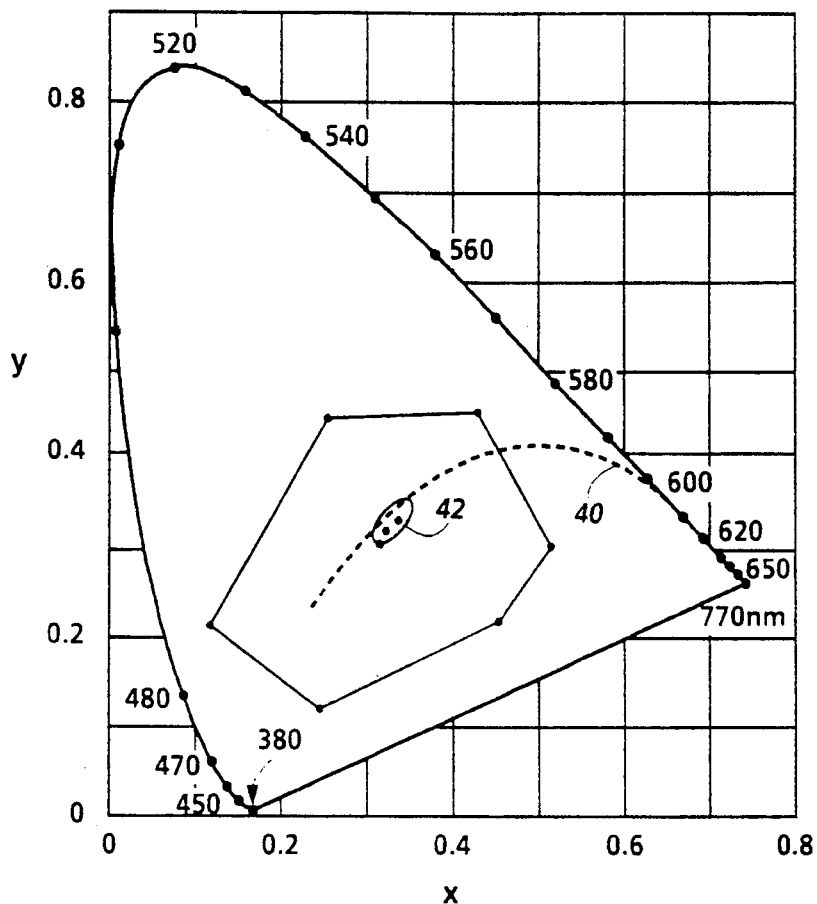
FIGS. 8A, 8B and 8C are graphs of the CIE linear mixing plane showing the achromatic region used to determine quantities of coloring agents according to the present invention.
Figure 8B:
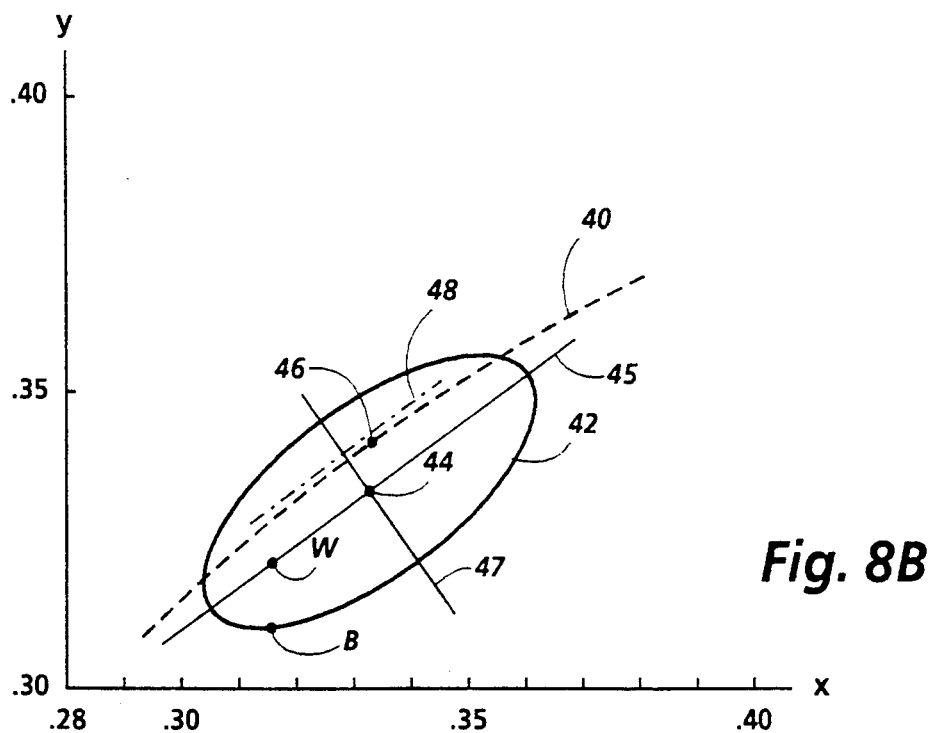

Turning first to FIGS. 8A and 8B, there is illustrated the achromatic region 42 as generated by the method of the present invention and as plotted in the Chromaticity Diagram. Achromatic region 42 is located in the Chromaticity Diagram relative to black body curve 40. Black body curve 40, also called the Planckian locus, is a plot of chromaticity points of Planckian radiators at different temperatures (K). The points represent the color stimuli produced by these Planckian radiators (ideal furnaces or full radiators) maintained at ideal temperatures, as given on the absolute temperature scale in kelvin (K). Additional information about Planckian locus 40 may be found in D. B. Judd and Gunter Wyszecki, *Color in Business Science and Industry*, John Wiley & Sons, 1975, at pages 164-169.

Figure 9:
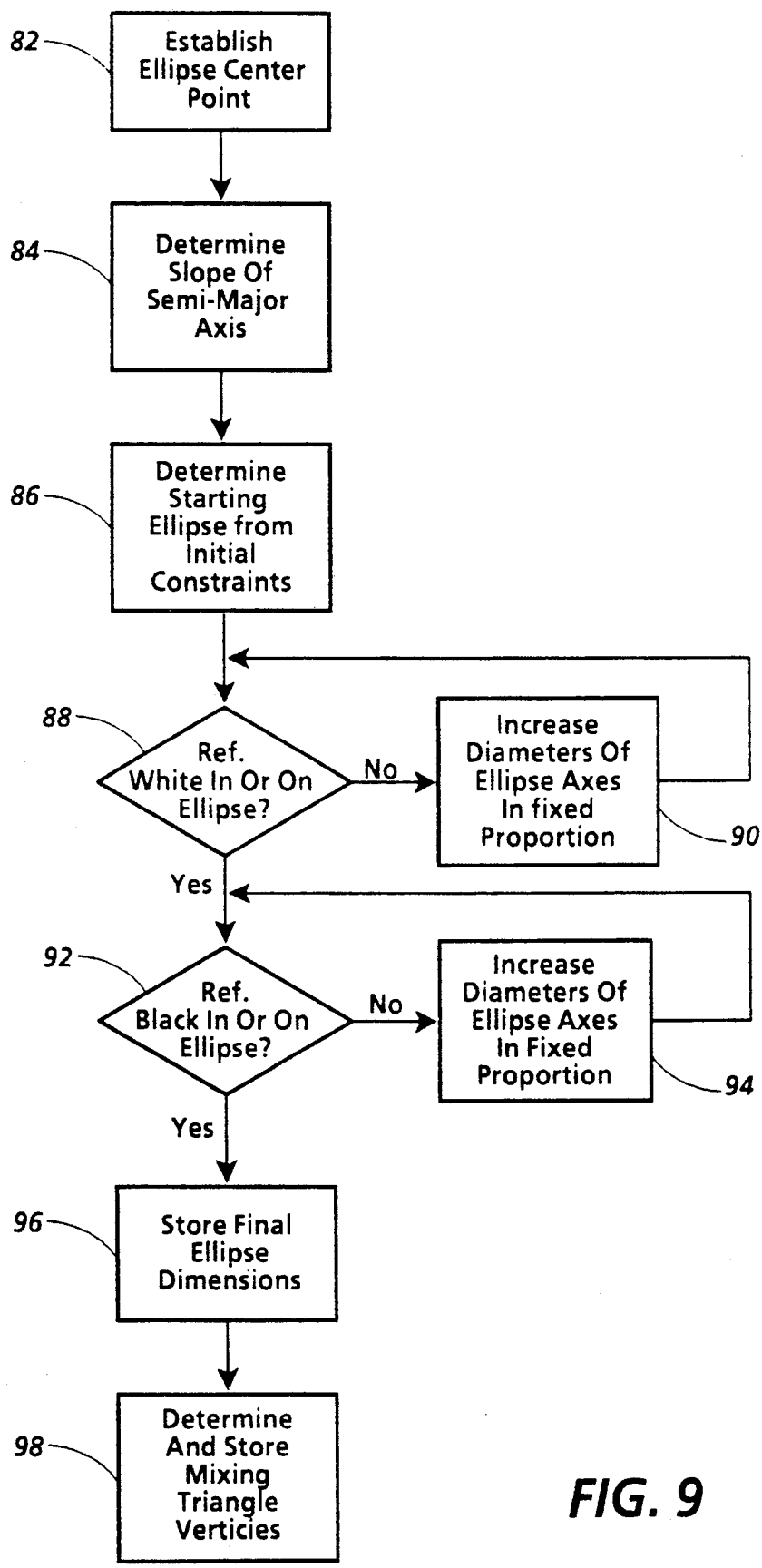
FIG. 9 is a flowchart illustrating in greater detail the steps of box 80 in FIG. 6, for creating the achromatic and mixing regions shown in FIGS. 8A, 8B and 11.

FIG. 8A shows achromatic region 42 plotted within the hexagonal device gamut which will be used to create the mixing triangles for mixing the primary and neutral coloring agents needed to match an original color. FIG. 8B shows a detailed portion of the Chromaticity Diagram where achromatic region 42 is plotted in relationship to black body curve 40. In the illustrated embodiment, the achromatic region found to be most suitable for improving color reproduction was an elliptically shaped region. FIG. 9 illustrates the steps for creating an elliptically shaped achromatic region 42 and will be discussed in relation to region 42 of FIG. 8B. The method illustrated in FIG. 9 for creating the achromatic ellipse uses conventional and known mathematical techniques for defining, representing, and manipulating ellipse structures.

In box 82 of FIG. 9, the center point for the ellipse is established. The center of achromatic ellipse 42 is point 44 which represents the chromaticity coordinates of the equal energy stimulus, as defined by the CIE, at x=0.333334 and y=0.3333330. Next, in box 84, the orientation of the ellipse in the Chromaticity Diagram is determined by finding the slope of the ellipse's. FIG. 8B shows that the semi-major axis 45 of ellipse 42, which is the longer axis of ellipse 42, is established as being approximately parallel to black body curve 40 by drawing a line passing through center 44 with slope equal to the slope of a line 48 tangent to black body curve 40 at point 46. Point 46 is the point on black body curve 40 with the same x chromaticity as the equal energy stimulus (x=0.333334).

Next, in box 86 of FIG. 9, an ellipse is defined from certain initial constraints. In the implemented embodiment, the achromatic ellipse starts as a minimally sized ellipse centered at the equally energy stimulus and capable of including within or on its boundary an arbitrary approximately neutral color defined at chromaticity coordinates, x=0.33100, y=0.33000. To accomplish this, the semi-major diameter of the ellipse is computed to be equal to 0.00488695 and the semi-minor diameter is computed to be equal to 0.00191228. It is preferable to maintain as constant the ratio of the ellipse's semi-major diameter to its semi-minor diameter. In the implemented embodiment, the ellipse's semi-major diameter is approximately four times the size of its semi-minor diameter. The two foci of this initial ellipse are then found to be at x, y chromaticity points (0.336860, 0.336125) and (0.329818, 0.330530), respectively.

The final size of the achromatic ellipse is determined to be the smallest ellipse needed to include both the measured reference white (substrate) and black coloring agents of the subtractive color reproduction device for which colors are being matched, labeled W and B respectively on FIG. 8B. In box 88 of FIG. 9 a test is made to determine whether the reference white point for the measured device is included within or is on the boundary of the currently defined ellipse. If the test is negative, the ellipse must be increased in size until the chromaticity coordinates for the reference white are within or on the boundary of the ellipse. It is preferable to accomplish this in small increments while maintaining the preferred, approximate four-to-one size ratio of the major and minor axes. One method for increasing the ellipse size is to multiply the length of each axis by a constant, such as 1.005. The test in box 88 and the incremental increase in the ellipse in box 90 are performed until the chromaticities for the measured reference white coloring agent for the measured device is included within or is on the boundary of the currently defined ellipse. In boxes 92 and 94, similar steps are performed to ensure that the chromaticities for the measured black coloring agent are included within or are on the boundary of the currently defined ellipse. The test in box 92 and the incremental increase in the ellipse in box 94 are performed until the ellipse reaches the preferred dimensions. Then, in box 96, these dimensions may be stored for later use in determining the saturation adjustment ratio step in box 110 of FIG. 6.

Figure 8C:
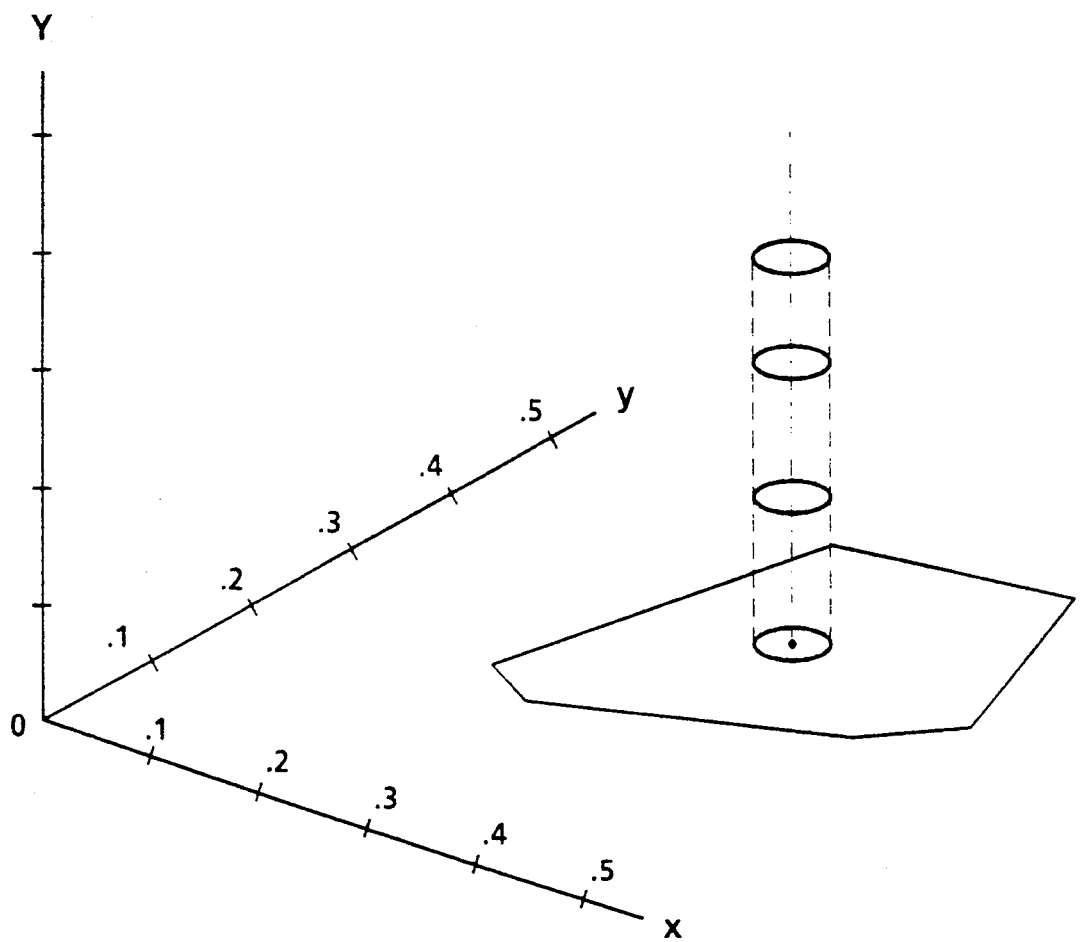

Conceptually, once defined by the steps in boxes 82 through 96 of FIG. 9, the elliptically shaped region remains a fixed, achromatic region at all reflectance values in the three-dimensional linear color mixing space, as shown in FIG. 8C. An original color with chromaticities falling within or on the boundary of the achromatic region at any reflectance level will be reproduced as an achromatic color, thereby eliminating the problems with the earlier method of hue shifts occuring for original colors with low chromas, and of hue shifts occurring for original colors with certain reflectance values.

Figure 3:
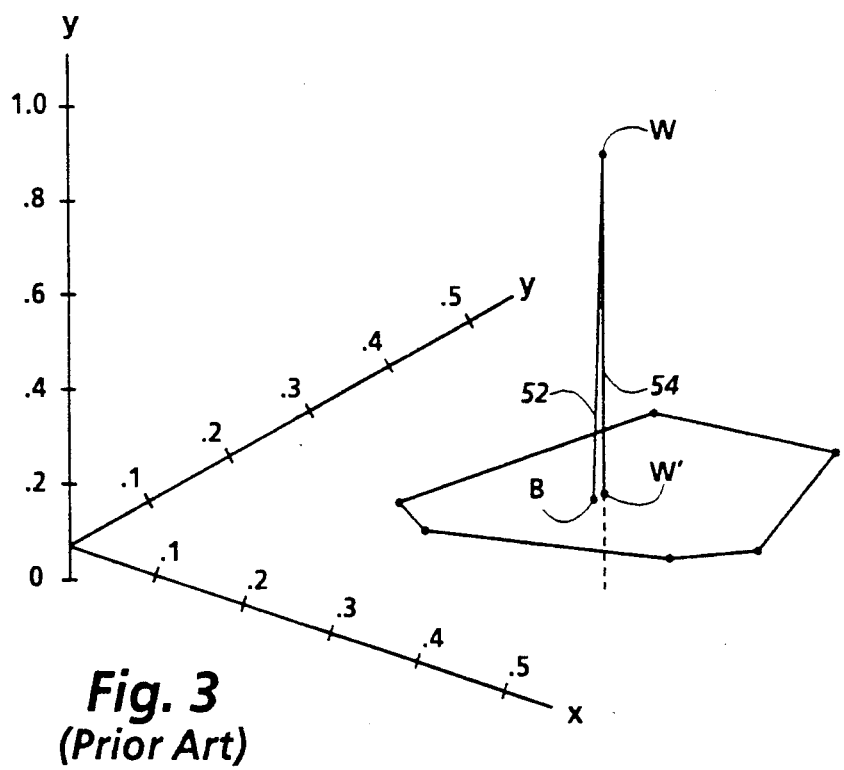
FIG. 3 is a three-dimensional graph of the linear mixing plane of FIG. 2 showing the achromatic mixing line used in the color matching method illustrated in FIG. 1.
Figure 4:
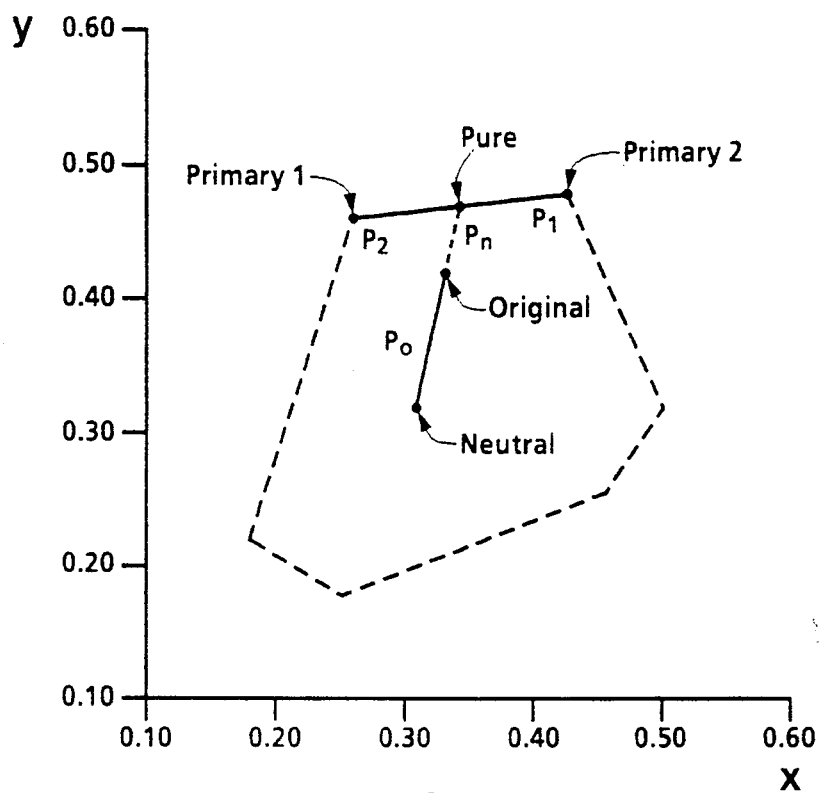
FIG. 4 is a graph of a portion of the CIE linear mixing plane of FIG. 2, showing how the quantities of coloring agents are determined according to the method of FIG. 1.
Figure 5:
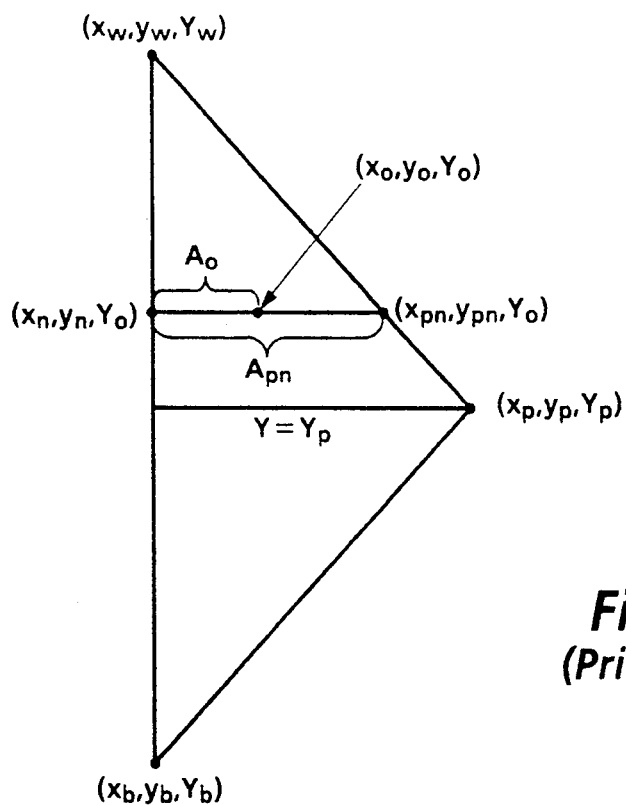
FIG. 5 is a graph of a linear mixing plane in which the saturation and reflectance may be adjusted according to the method illustrated in FIG. 1.

The color mixing regions of the linear mixing plane are defined next, in box 98. The mixing regions are created as triangles, as in the earlier method (see FIG. 2). Each triangle has as its base one side of the hexagon, with one of its base vertices being at the x, y coordinates of one of the subtractive CMY primaries and the other at the x, y coordinates of one of the subtractive RGB primaries. In the earlier color matching method, the third vertex of each color mixing triangle was a center point, defined preferably at the x, y coordinates of a neutral color which varied with each original color and fell somewhere on achromatic mixing line 52 (FIG. 3). In contrast to the earlier method, the present method creates one set of fixed mixing triangles using the measured, reference white of the substrate (paper) as the center point of the subtractive color reproduction gamut defined by the measured coloring agent chromaticity coordinates. Thus, each mixing triangle has, as the coordinates of one vertex, the measured, reference white chromaticities, and as the coordinates of the other two vertices, the measured chromaticity coordinates for respective pairs of primary and secondary coloring agents. Since the coordinates of each mixing triangle are now known, the dimensions of each triangle may be computed and stored once, in box 98, for all subsequent calculations needed to perform color mixing.

Figure 10:
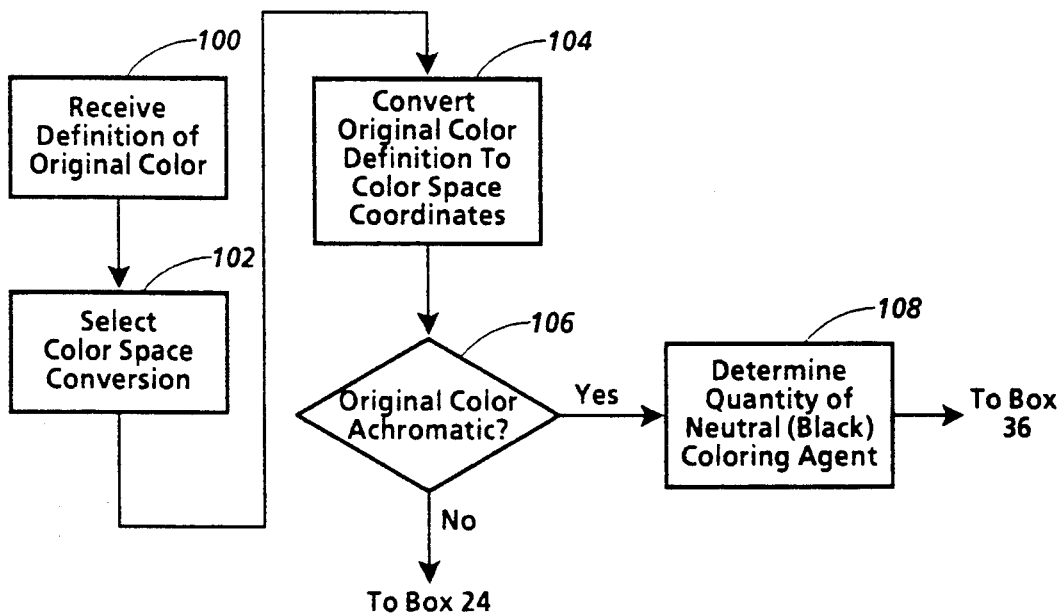
FIG. 10 is a flowchart illustrating in greater detail the steps of box 22 in FIG. 6, for converting the definition of the original color to coordinates in a linear mixing space.

Returning now to FIG. 6, the next step in the method of the present invention is to receive the definition of the original color, in box 22, and convert that definition to linear mixing coordinates in the same color space as those measured and stored in box 20. FIG. 10 shows the operational steps for implementing the step in box 22. The original color's definition is received in box 100. If the definition is expressed as quantities of additive RGB color quantities, for example, which generate the original color, standard techniques are well known for converting such quantities to CIE chromaticity coordinates. As noted above, the original color's additive RGB coordinates are converted first into CIE XYZ tristimulus values and then into x, y, chromaticities using known equations.

The proper conversion technique is selected next, in box 102. For additional accuracy in the illustrated embodiment of the method of the present invention, several conversion methods (transformations) are provided to accommodate RGB color specifications produced from different sources. If it is known, for example, that a particular additive device utilizing NTSC standard primaries produced the original color, it is preferable to select the transformation technique which specifically transforms the RGB color specification to CIE tristimulus values with respect to the particular phosphors which created the original color, and with respect to the reference white of the particular additive device. In the implemented embodiment, conversion methods for two standard sets of RGB phosphors, known in the art as "long persistence" and "short persistence" phosphors, are provided for selection in box 102.

In addition, a third conversion method is provided which is intended to facilitate the reproduction of an original image such that the output colors are predictably spaced in the output gamut in the same manner as the colors in the input image relate to each other. This reproduction goal may be preferred in the situation where maximum color matching of the original color image is not required, but clearly and predictably spaced, discriminable colors are the goal. Such a situation, for example, might apply to features in univariate map images such as CAT and EMR scans, astronomical images, and geophysical maps. The conversion method provided for this situation treats the RGB color specifications as though, for the equal energy stimulus, $R=G=B$ and, for the tristimulus values XYZ, $X=Y=Z$. For further information regarding transformations from RGB color specifications to tristimulus values, see *Raster Graphics Handbook*, at pages A3-17 to A3-23; James D. Foley, Andries van Dam, Steven K. Feiner, and John F. Hughes, *Computer Graphics, Principles and Practice*, Addison Wesley, 1990, at pages 574-584; and R. W. G. Hunt, *Measuring Colour*, Ellis Horwood Limited, Chichester, England, 1987 (reprinted in 1989), Chapter 2, Section 2.5, pgs. 45-46, and Chapter 6, Sections 6—6 through 6-7, pgs. 135-139.

With continued reference to FIG. 10, once the conversion method has been selected in box 102, the original color's definition is converted in box 104. Then, in box 106, a test is made to determine whether the original color is achromatic. Making this determination now provides a short cut in the method. If the original color is achromatic, the amount of neutral (black) coloring agent may be directly calculated, in box 108. The test for determining whether the original color is achromatic is simply to determine whether the chromaticity coordinates of the original color, $x_o$, $y_o$, are inside achromatic region 42 (FIG. 8B). The details of this mathematical determination depend on the type of achromatic region 42 defined. In the illustrated embodiment, achromatic region 42 is an ellipse and the determination is accomplished mathematically using conventional techniques for testing whether a point is inside or on the boundary of an ellipse.

The amount of neutral (black) coloring agent, determined in box 108, is determined to be equal to 1—the reflectance ($Y_o$) of the original color. The quantities of the other primary coloring agents are set to zero, and the method then proceeds directly to box 36 for selection of the pattern for producing the matching color, since the steps in boxes 24, 28, 30, 110, 140, and 34 for determining the quantities of the primary coloring agents are not necessary.

Once the original color's coordinates have been converted into appropriate linear mixing coordinates, the luminance, or reflectance value Y, of the original color is then adjusted, in box 24 of FIG. 6, for out-of-bounds reflectance values, which occur when an original color is lower in reflectance than the measured black coloring agent or higher in reflectance than the measured paper white. This is accomplished in the same manner as in the known color matching method of FIG. 1.

Figure 11:
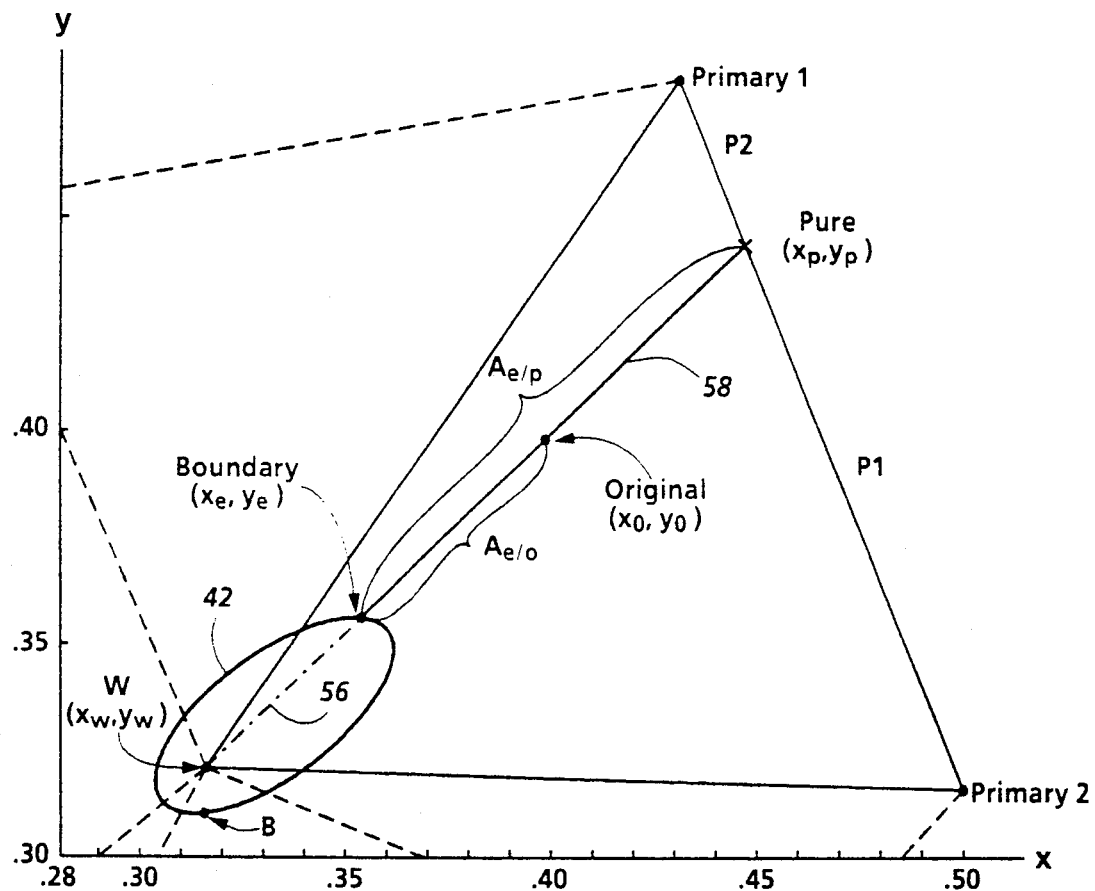
FIG. 11 is a graph of the CIE linear mixing plane showing the achromatic and polygonal mixing regions used to determine quantities of coloring agents according to the present invention.

The next step in the improved color reproduction method of FIG. 6 is to find the pure hue for an original color. The pure hue is a color of the same hue as the original color which can be generated without any neutral coloring agents. In other words, the pure hue falls on the linear mixing line between two of the primary coloring agents, within one of the mixing triangles, as shown in FIG. 11. The pure hue is found by determining the relative quantities of the two selected primaries which generate it, based on the position of an intersection point along the linear mixing line.

The pure hue is found in the same manner as in the known color matching method of FIG. 1. Briefly restating, determining the pure hue involves first finding the two primary coloring agents, in box 28, which designate the mixing triangle to be used. The two primary coloring agents may be selected using a vector cross-product technique in the same manner as described in detail in U.S. Pat. No. 4,751,535 at col. 12 line 56. However, as noted above, the coordinates of the primary and secondary coloring agents and the center point defining the three vertices for each mixing triangle are fixed coordinates, previously defined in box 80 of FIG. 6. FIG. 11 shows the primary color pair defining the vertices of one mixing triangle, designated as Primary 1 and Primary 2, respectively. As noted above, the third vertex of each mixing triangle is the measured reference white coloring agent, at coordinates $x_w$, $y_w$, labeled W.

The x,y coordinates of the pure hue, $x_p,y_p$, in the two-dimensional linear mixing plane of FIG. 11 are determined next, in box 30 of FIG. 6, in substantially the same manner as described above in the discussion of box 30 in FIG. 1. The pure hue, designated PURE, is at the intersection of a line projecting from center white point W through the original color with the line which makes up the side of the selected mixing triangle connecting two primary coloring agents. The primary coloring agents, Primary 1 and Primary 2, at the end points of the intersected side always include one of the CMY primary coloring agents and one of the RGB secondary coloring agents. These coloring agents are "mixed" in relative quantities to obtain the pure hue according to the relationship between the lengths of the parts, $P_1$ and $P_2$, into which the line of the intersected side is divided. The coordinates of the pure hue are needed to find the relationship between the lengths of the parts, $P_1$ and $P_2$, and to determine these relative quantities. The coordinates, $x_p$, $y_p$, of the pure hue are determined in the same manner as described in the earlier color matching method, using line slope equations. Then, the relative quantities P1 and P2 of Primary 1 and Primary 2 respectively are determined from the coordinates of the pure hue, $x_p,y_p$, according to Equations (1), (2), and (3), above.

One of the advantages of the earlier color matching method is that saturation and reflectance can be flexibly adjusted to obtain the matching color in whatever way is appropriate to the image being produced. The calculations to be performed in box 32 of FIG. 1 may be tailored to the specific image whose colors are being matched in order to produce a color which closely matches the original color and which, in combination with other matching colors, preserves the color characteristics of the original image. As noted above, the specific implementation of the step in box 32 preserves reflectance characteristics at the expense of saturation characteristics, an approach which is often useful and which may be especially desirable if the original image has many shades of colors outside the available reflectance range.

The present invention provides for adjusting saturation, in box 110 of FIG. 6, without regard to the reflectance of the original color, and with respect to the saturation range available in the mixing triangle that is outside the achromatic region. This saturation adjustment, which will be designated SR, like the adjustment denoted $R_{p/n}$ in the earlier method, is fundamentally a ratio of the original color's hue to the pure hue. However, the saturation adjustment in the present invention is based on the premise that, for each portion of the subtractive color reproduction device gamut at any reflectance level, there is an achromatic range that affects the permissible saturation range for the matching color. Depending on the particular gamut and on the shape of the achromatic region, this achromatic range may be a unique region for each portion of the gamut defined by a mixing region. FIG. 11 usefully illustrates this concept. A central portion and one mixing triangle, with vertices designated Primary 1, Primary 2, and W, of the subtractive color reproduction device gamut are drawn in a portion the Chromaticity Diagram serving as the linear mixing space. Portions of other mixing triangles are designated by the dotted lines emanating from the reference white center point, $x_w$, $y_w$. It can be seen that the portion of achromatic region 42 falling within each mixing triangle is different for each mixing triangle.

The implementation of the step for adjusting saturation in box 110 (FIG. 6) recognizes that a ratio of the original hue to the pure hue calculated for adjusting saturation should not include the portion of the distance representing the hue that is inside the achromatic region. That distance is represented as dotted line segment 56 in FIG. 11. As already stated, an original color falling within the achromatic region along line segment 56 will be reproduced as an achromatic color, with no quantities of the primary CMY coloring agents applied at all. It follows from this that the saturation for a color matching an original color falling along line segment 58 should be determined along a range extending only from some minimally saturated color, at the boundary of achromatic region 42, at point $x_e,y_e$, where line segment 58 intersects with achromatic region 42, to the most saturated color available in the gamut, at the $x_p,y_p$ coordinates of the PURE color. Thus, the saturation adjustment ratio in the present invention scales the saturation of the original color to a saturation between a minimum saturation outside the achromatic region and the maximum saturation at the pure hue.

Figure 12:
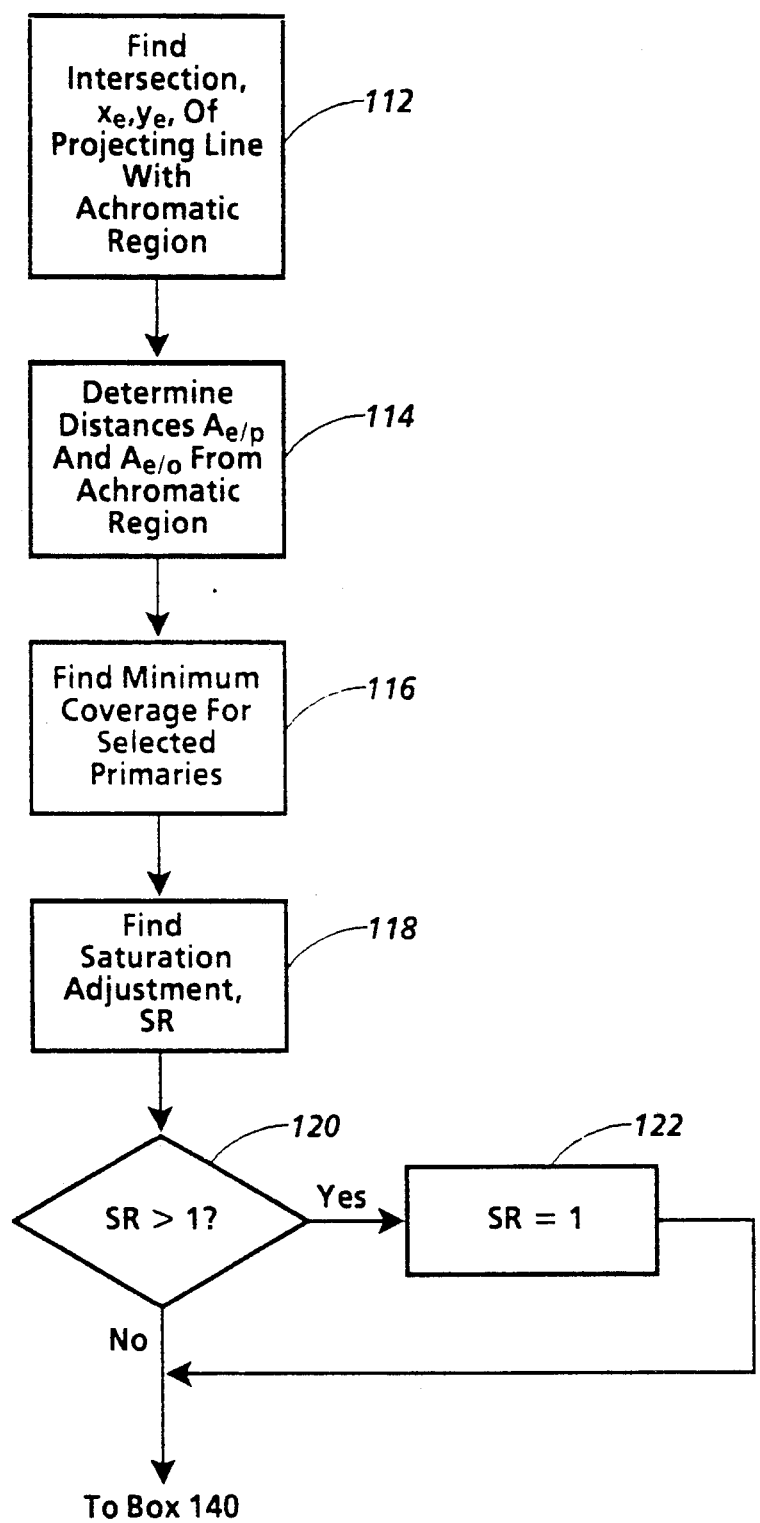
FIG. 12 is a flowchart which illustrates in greater detail the operation of block 110 in FIG. 6 for adjusting saturation.

FIG. 12 illustrates the steps in implementing the saturation adjustment concept illustrated geometrically in FIG. 11. First, there is calculated in box 112, the coordinates of the boundary intersection point, $x_e,y_e$, of achromatic region 42 with the line projecting from the reference white through the original color to the pure hue, denoted $x_p,y_p$. The details of this calculation depend on how achromatic region 42 is designated. In the illustrated implementation, achromatic region 42 is an ellipse. Finding boundary point $x_e,y_e$ involves conventional mathematical techniques for determining the equation for line 58, solving simultaneous equations for the two intersections of line 58 with ellipse 42, and finding the proper intersection point as the one closest to the coordinates of the original color. It is preferable to first test whether the slope of line 58 is greater than 45°. In the instance where the slope of line 58 is greater than 45°, some computational difficulty can be avoided by changing the slope of the line from y/x to x/y.

Once the coordinates of the boundary intersection point, $x_e, y_e$ have been determined, the distance from the boundary to the pure hue, designated as $A_{e/p}$ and from the boundary to the original color, designated as $A_{e/o}$ may be easily determined, in box 114, using equations (20) and (21) below:

$$A_{e/p} = \{(x_p - x_e)^2 + (y_p - y_e)^2\}^{0.5} \qquad (20)$$

$$A_{e/o} = \{(x_o - x_e)^2 + (y_o - y_e)^2\}^{0.5} \qquad (21)$$

The next step, in box 116, involves determining the minimal primary coloring agent quantity for the selected primary pair, Primary 1 and Primary 2. A color matching an original color located just beyond the boundary of achromatic region 42 will have the minimal saturation available for the saturation range permissible, and will be accurately reproduced by applying only a small quantity of the primary coloring agents. This quantity, however, depends on the particular primary pair, and thus should be reflected in the calculation of the saturation ratio. In the implemented embodiment illustrated in FIGS. 11 and 12, the minimal primary coloring agent quantity for the selected primary pair, Primary1 and Primary2, designated as AMTMIN is computed as follows, $$AMTMIN = \frac{A_{e/p} * MINDEN}{1 - MINDEN} \qquad (22)$$

where the quantity MINDEN is an average of the two lowest area coverages available for the first primary of a particular primary pair, and * denotes multiplication. The minimum area coverages are available from the area coverage table utilized in later steps to select the patterns to apply to achieve the proper primary coloring agent quantities to reproduce a matching color. In particular, the index into the area coverage table for the minimum area coverage available for Primary1 should be identified, and used to retrieve the appropriate minimum coverage. Then, the next lowest minimum coverage may be retrieved, and the two minimum coverages averaged together to produce the MINDEN quantity. Preferably, the quantities MINDEN and 1−MINDEN are determined and stored for each primary pair once to minimize access to the area coverage table.

Next, in box 118, the saturation adjustment ratio, SR is computed from Equation (23):

$$SR = \frac{A_{e/o} + AMTMIN}{A_{e/p} + AMTMIN} \qquad (23)$$

In box 120, the saturation adjustment ratio is tested to see if it is greater than 1.0. If it is greater than 1.0, which may happen if the original color is outside the gamut along line 58, it is limited, in box 122, to 1.0, a quantity representing 100% of the primary coloring agent which is one of the CMY primaries. The method then continues with the step of determining the reflectance in box 140 of FIG. 6.

In the earlier method illustrated in FIG. 1, the reflectance of the pure hue, $Y_p$, is calculated, in Equation (4) above by applying the primary coloring agent fractional line lengths, P1 and P2, to the reflectance value of the respective primary color and summing the individual reflectances. This results in a balanced, average reflectance for the pure hue falling between the reflectances of the selected primaries. Then, if this reflectance is greater than the reflectance of the original color, the reflectance of the pure hue is too high, and the primary coloring agent quantities are adjusted by adding a quantity of black, according to a computed ratio, $t_{p/n}$. Ultimately, as Equations (8) through (13) in Table 1 above show, the saturation ratio in the earlier method, $R_{p/n}$, was also affected by the reflectance adjustment and the decision to add black.

Figure 13:
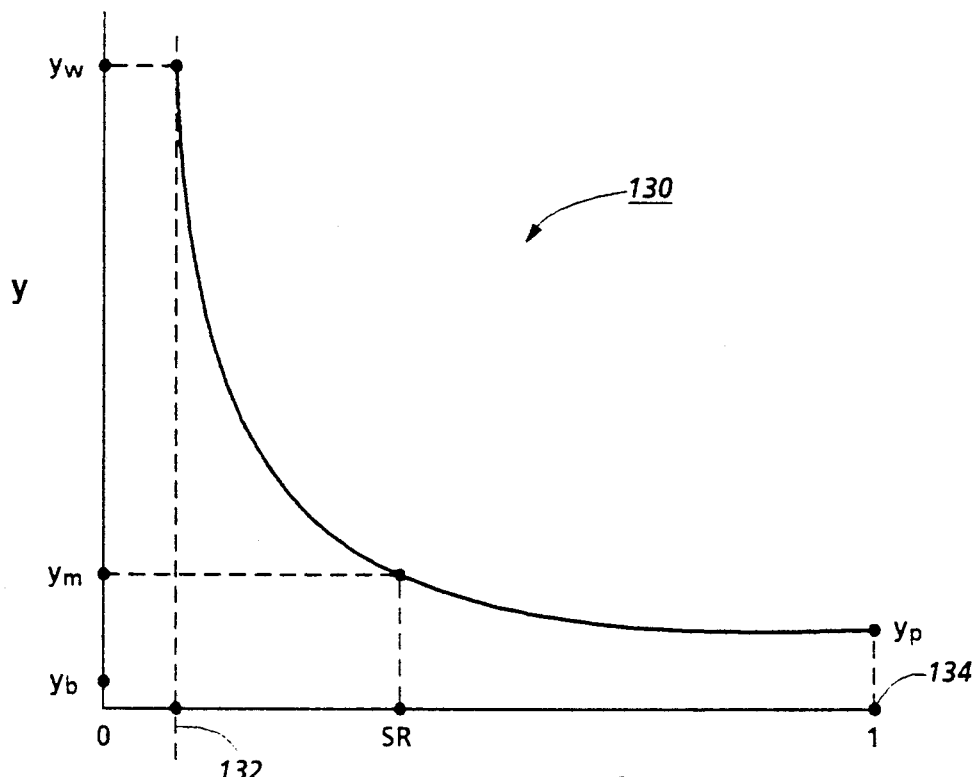
FIG. 13 is a graph mapping a range of saturation ratios to a reflectance curve for determining reflectance of the matching color according to the present invention.

In contrast to the earlier method, the reflectance for the matching color, designated $Y_m$, in the present invention is determined from a reflectance curve representing the mapping of the range of saturation ratios available to a curve of reflectance values for the primary coloring agents. FIG. 13 illustrates graph 130 for such a reflectance curve. The x axis of graph 130 contains the range of saturation ratios (SR from Equation (23)) available, beginning with a saturation ratio near zero to the right of dotted line 132 which represents the boundary of achromatic region 42 (FIG. 11), and extending to the maximum saturation of 10 at point 134. The y axis of graph 130 represents the range of available reflectance values, from $Y_b$, the reflectance for the black coloring agent, to $Y_w$, the reflectance for the reference white substrate (paper). For a given saturation ratio, SR, a point on the reflectance curve corresponds to the reflectance of the matching color, $Y_m$. The function used to map the saturation ratios to the reflectance curve to produce the reflectance for the matching color, $Y_m$, has been discovered through empirical methods, and is given by the following equation:

$$Y_m = \{Y_w^{(1.0 - SR10(Y_o - Y_p))}\} * \{Y_p^{SR}\} \qquad (24)$$

and, $$Y_m = 1.0 \text{ if } Y_m > 1.0 \qquad (25)$$

where
  $Y_o$ is the reflectance of the original color;
  $Y_p$ is the reflectance of the pure hue calculated using Equation (4);
  SR is the saturation ratio found for the matching color in Equation (23) above; and
  *denotes multiplication.

Returning now to FIG. 6, once the reflectance for the matching color, $Y_m$, has been determined, the quantities of the coloring agents needed to match the original color may be determined, in box 34 of FIG. 6. The coloring agent quantities to be calculated are those of the black coloring agent, denoted as $a_b$, and the two primary coloring agents which mix to provide the pure hue. The quantity of black coloring agent can be directly calculated, using the results of Equations (24) and (25) which map the saturation ratio to the reflectance curve for the primary coloring agents. The quantity of black is the quantity which will be added to the coloring agent mixture applied to produce the matching color. If the reflectance of the original color, designated $Y_o$, is greater than the computed reflectance of the matching color, $Y_m$, then the amount of black coloring agent, $a_b$, is set to zero, and no black is added to produce the matching color. For all other cases, however, $a_b$ is computed as follows:

$$Y_{o/range} = (Y_o * (Y_w - Y_b)) + Y_b \tag{26}$$

where $Y_{o/range}$ is a modified reflectance value for the original color, based on its position in the total range of available reflectances from $Y_b$ to $Y_w$, and, $$a_b = \frac{(Y_m - Y_{o/range})}{(Y_m - Y_b)} \tag{27}$$

The quantities of the primary coloring agents are determined in the same manner as in the known color matching method of FIG. 1. As discussed above, the quantities of the primary coloring agents must take into account the selection of the primary color pair in box 28, since the total quantity of the pure hue is made up of a subtractive CMY primary and an adjacent subtractive RGB primary, which is actually generated from two of the subtractive CMY primaries. One CMY primary will be present throughout the pure hue areas, while the other CMY primary will be superimposed with the first primary only in the RGB primary areas. The relative amounts of each CMY primary depend in which mixing triangle the original color falls. Table 3 provided above summarizes how to determine the quantities of CMY primaries according to the new ratios of pure hue to original hue, and pure hue reflectance to original hue reflectance. The total quantity of the pure hue, $a_p$, used in Table 3 is equal to the saturation adjustment ratio, SR in Equation (22) above, and the P1 and P2 quantities used in Table 3 are the quantities determined in box 30 (FIG. 6), using equations (2) and (3) above.

Figure 14:
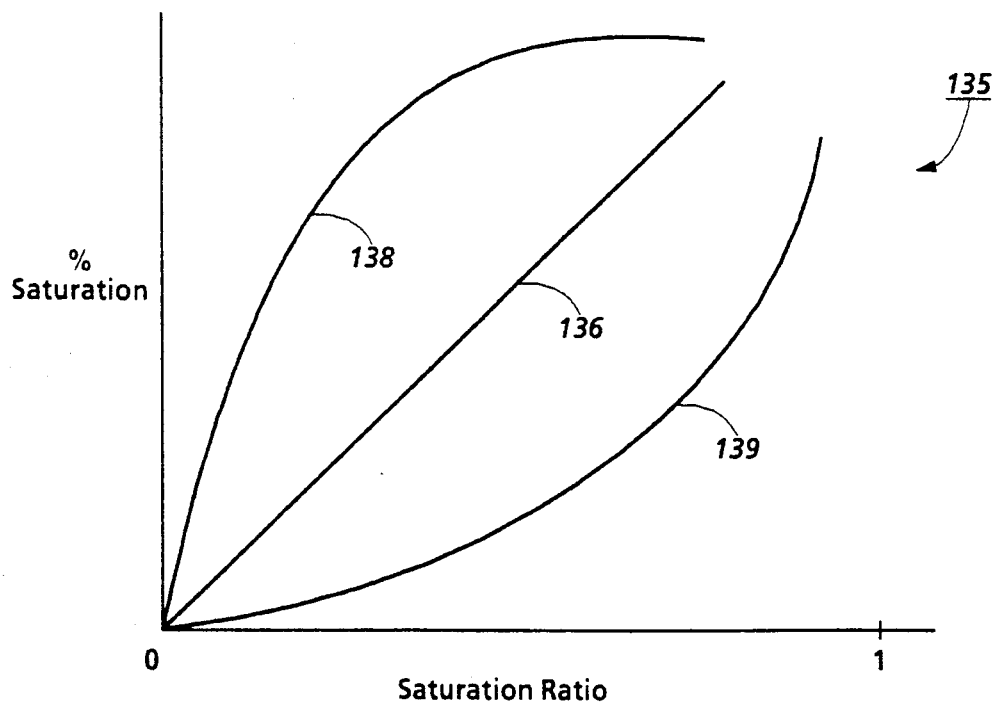
FIG. 14 is a graph illustrating how a saturation accelerator factor operates to adjust the quantities of primary coloring agents in order to preserve the characteristics of an original image.

In the case where the original image is a highly saturated, very colorful image, the method of the present invention may produce a saturation ratio, SR, for the particular subtractive reproduction device gamut which produces too few fully saturated matching colors. The method of the present invention also provides for the user to the method to adjust the quantities of the primary coloring agents to produce more highly saturated matching colors by, in effect, accelerating the saturation ratio's affect on determining the primary coloring agents. FIG. 14 illustrates this concept. Graph 135 plots the saturation ratio, SR, against the percentage of saturation for the primary coloring agents. Straight line 136 represents the rate at which saturation of the primary coloring agents occurs when the saturation ratio determines the quantities of primary coloring agents without modification. Curve 138 is the rate at which saturation of the primary coloring agents occurs when the saturation ratio determines the quantities of primary coloring agents according to the function, $$a_p = SR^{SA} \tag{28}$$

where the power SA is any positive real number exponent representing a saturation accelerator factor. In the illustrated embodiment, it has been empirically determined that a saturation accelerator factor of 0.4 provides an aesthetically pleasing reproduction of a highly saturated image, taking full advantage of the most highly saturated colors the subtractive reproduction device is able to produce, those at the edges of the device gamut. However, the user of the present method is able to select a saturation accelerator factor anywhere in the range of zero to one. Similarly, the saturation accelerator factor may become a decelerator when the factor is selected to be greater than one. Curve 139 illustrates a saturation deceleration curve for use in reproducing an original image with predominantly light, less saturated colors.

The quantities of each of the secondary coloring agents are modified in a similar manner when the saturation accelerator factor is supplied to the method. Thus, in terms of determining the quantities of primary coloring agents according to Table 3, the quantities specified for each coloring agent should be modified by the saturation accelerator factor as follows:

$$P1 * a_p \text{ becomes } (P1 * a_p)^{SA} \tag{29}$$

and $$P2 * a_p \text{ becomes } (P2 * a_p)^{SA} \tag{30}$$

Finally, in box 36 of FIG. 6, an area coverage pattern is selected which will best approximate the coverage provided by the quantities of the two primary and the neutral primary coloring agents. This pattern is selected in the same manner as described in U.S. Pat. No. 4,751,535 in columns 18-19. In box 38 the selected pattern is applied to produce a color matching the original color.

The technique of the invention has been discussed in relation to converting CRT colors based on additive RGB phosphors into printed colors based on subtractive CMY toners, but is equally applicable to any other color matching problem. For example, instead of RGB color coordinates, HLS or LUV coordinates could be received and converted into coordinates in a linear mixing color space from which coloring agent quantities could then be determined. Colors printed on an electrostatic printer could be matched to thermally printed colors, and printed colors could be matched on a CRT display.

In recapitulation, the color matching method of the present invention provides an accurate, user-tailored, and convenient method for reproducing accurate and appropriate colors in a subtractive color reproduction system. The color matching technique of the present invention has been used to produce test patterns of smoothly and uniformly changing color patches exhibiting a high degree of color reproduction control. The present invention proves to be superior in gray balance control to the method disclosed in U.S. Pat. No. 4,751,535. It is therefore evident that there has been provided in accordance with the present invention, a method that fully satisfied the objects, aims, and advantages hereinbefore set forth.

While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and scope of the appended claims.

What is claimed:

1. In a method for reproducing an original color using a linear mixing space comprising the step of
   performing linear mixing calculations in the linear mixing space with linear coordinates of the original color and linear mixing coordinates of at least two primary coloring agents and with linear mixing coordinates of at least one neutral coloring agent to determine quantities of the coloring agents to be used to generate a color approximating the original color;

the improvement comprising defining an achromatic region in the linear mixing space; and wherein the linear mixing calculations include calculations based on a positional relationship in the linear mixing space between the original color and the achromatic region.

2. The method according to claim 1 in which the achromatic region is an elliptically shaped region containing linear mixing coordinates of at least two neutral coloring agents; having a center point defined by linear mixing coordinates of an equal energy stimulus; and having a semi major axis oriented in the linear mixing space substantially parallel to a line tangential to a curve defined by linear mixing coordinates of a plurality of Planckian radiators, the tangential line being tangent to a point on the curve approximately equal to one of the linear mixing coordinates of the equal energy stimulus.

3. The method according to claim 2 wherein the size of the elliptically shaped achromatic region is defined by a constant proportional relationship between the semi major axis and a semi minor axis.

4. The method of claim 3 wherein the constant proportional relationship is a ratio of approximately four to one.

5. The method according to claim 1 further including selecting the at least two primary coloring agents from at least three primary coloring agents, the at least three primary coloring agents having linear mixing coordinates which define a polygon in the linear mixing space;

selecting linear mixing coordinates of a center point within the polygon;

and wherein the step of selecting the at least two primary coloring agents includes selecting two of the at least three primary coloring agents whose coordinates define vertices at ends of a side of the polygon which intersects a line projecting from the center point's coordinates through the original color's linear mixing coordinates;

the achromatic region is inside the polygon; and when the linear mixing coordinates of the original color are outside the achromatic region, the step of performing linear mixing calculations to determine the quantities of the coloring agents to be used to generate the approximated color includes calculating relative quantities of the selected primary coloring agents based on lengths of parts of the side of the polygon;

calculating a saturation adjustment ratio based on lengths of parts of the projecting line which are outside the achromatic region, for adjusting the relative quantities of the selected primary coloring agents to determine the quantities of the primary coloring agents to be used to generate the approximated color; and calculating the quantity of the at least one neutral coloring agent based on a calculated reflectance for the approximated color.

6. The method according to claim 5 in which the step of calculating the saturation adjustment ratio further includes scaling the saturation adjustment ratio from a minimum nonzero saturation adjustment quantity representing the saturation adjustment ratio for an original color closely positioned to the achromatic region on the projecting line, to a maximum saturation adjustment quantity representing the saturation adjustment ratio for an original color positioned on the projecting line at or outside the side of the polygon.

7. The method according to claim 6 in which the substep of calculating the quantity of the neutral coloring agent includes calculating a reflectance coordinate for the approximated color according to a reflectance curve function which relates the saturation adjustment ratio to a range of reflectance values for the approximated color; and using the calculated reflectance coordinate, a reflectance coordinate for the original color, and a reflectance coordinate for the neutral coloring agent to determine the quantity of the neutral coloring agent.

8. The method according to claim 5 in which the step of performing linear mixing calculations further includes applying a saturation accelerator factor to the quantities of primary coloring agents to be used to generate the approximated color, so that, when an original image contains highly saturated original colors, the approximated color will be mapped into a compressed high saturation range of colors with other approximated colors similarly generated.

9. The method according to claim 1 wherein one of the linear mixing coordinates of the original color is a reflectance coordinate defining a reflectance value of the original color; and when the linear mixing coordinates of the original color are inside the achromatic region, the step of performing linear mixing calculations further includes determining the quantities of the at least two primary coloring agents to be zero; and calculating a quantity of the at least one neutral coloring agent based on the reflectance value of the original color.

10. The method according to claim 1 in which the achromatic region is a maximum size sufficient to contain linear mixing coordinates of at least two neutral coloring agents; and the step of performing linear mixing calculations in the linear mixing space includes performing two-dimensional linear mixing with the original color's linear mixing coordinates and with the linear mixing coordinates of the primary coloring agents to obtain linear mixing coordinates of a hue approximating that of the original color; and performing two-dimensional linear mixing with the linear mixing coordinates of the hue and of the original color, and with linear mixing coordinates of a point on the boundary of the achromatic region, to determine a saturation adjustment ratio quantity to adjust the hue to obtain the approximated color; the point on the boundary of the achromatic region being an intersection point of the boundary of the achromatic region with a line projecting from the linear mixing coordinates of one of the at least two neutral coloring agents through the original color's linear mixing coordinates.

11. The method according to claim 10 in which the step of performing linear mixing calculations in the linear mixing space further includes performing linear mixing with a reflectance coordinate of the hue, with a reflectance coordinate of the original color, and with a reflectance coordinate of the at least one neutral coloring agent to determine a neutral coloring agent quantity to adjust the hue to obtain the approximated color.

12. The method according to claim 11 in which the substep of performing linear mixing with reflectance coordinates includes determining a reflectance coordinate for the approximated color according to a reflectance curve function which relates the saturation adjustment ratio quantity to a range of reflectance values for the approximated color.

13. The method according to claim 11 in which the substep of performing linear mixing with reflectance coordinates includes determining a reflectance coordinate, $Y_m$, for the approximated color according to the equation, $$Y_m = \{Y_w^{(1.0 - SR10(Y_o - Y_p))}\} * \{Y_p^{SR}\}$$

where
- $Y_o$ is the reflectance coordinate of the original color;
- $Y_p$ is the reflectance coordinate of the hue;
- $Y_w$ is the reflectance coordinate of the neutral coloring agent;
- SR is the saturation adjustment ratio quantity; and
- * denotes multiplication.

14. A method for reproducing an original color using a linear mixing space to determine quantities of primary coloring agents and at least one neutral coloring agent to be used to generate a color approximating the original color, the method comprising the steps of
- determining quantities of original coloring agents which generate an original color;
- determining linear mixing coordinates of the original color in the linear mixing space based on the quantities of original coloring agents;
- defining a polygon in the linear mixing space using linear mixing coordinates of at least three primary coloring agents;
- selecting linear mixing coordinates of a center point within the polygon;
- selecting, from the at least three primary coloring agents, at least two primary coloring agents whose coordinates define vertices at ends of a side of the polygon which intersects a line projecting from the center point's coordinates through the original color's linear mixing coordinates;
- defining an achromatic region in the polygon having a maximum size sufficient to contain linear mixing coordinates of at least two neutral coloring agents;
- calculating the quantities of the selected primary coloring agents and the at least one neutral coloring agent according to the positional relationship in the linear mixing space between the original color and the achromatic region;
- storing an area coverage value for each of a set of available coloring agent patterns;
- selecting a pattern which closely approximates the calculated quantity of each coloring agent; and
- applying the coloring agents in the pattern to reproduce the original color.

15. The method according to claim 14 in which the calculating step includes
- calculating relative quantities of the selected primary coloring agents based on lengths of parts of the side of the polygon intersected by the projecting line;
- calculating a saturation adjustment ratio based on lengths of parts of the projecting line which are outside the achromatic region, for adjusting the relative quantities of the selected primary coloring agents to determine the quantities of primary coloring agents;
- calculating a reflectance coordinate for the approximated color according to a reflectance curve function which relates the saturation adjustment ratio to a range of reflectance values for the approximated color; and
- calculating the quantity of the neutral coloring agent using the calculated reflectance coordinate, a reflectance coordinate for the original color, and a reflectance coordinate for the neutral coloring agent.

* * * * *